(12) United States Patent
Kotera

(10) Patent No.: US 9,575,761 B2
(45) Date of Patent: Feb. 21, 2017

(54) SYSTEM AND METHOD FOR UPDATING AN INSTRUCTION CACHE FOLLOWING A BRANCH INSTRUCTION IN A SEMICONDUCTOR DEVICE

(71) Applicant: Renesas Electronics Corporation, Kawasaki-shi, Kanagawa (JP)

(72) Inventor: Isao Kotera, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 48 days.

(21) Appl. No.: 14/223,441

(22) Filed: Mar. 24, 2014

(65) Prior Publication Data

US 2014/0297958 A1    Oct. 2, 2014

(30) Foreign Application Priority Data

Mar. 28, 2013   (JP) .................................. 2013-069891

(51) Int. Cl.
  *G06F 9/38*   (2006.01)
  *G06F 12/08*  (2016.01)
  *G06F 12/12*  (2016.01)

(52) U.S. Cl.
  CPC .......... *G06F 9/3804* (2013.01); *G06F 9/3846* (2013.01); *G06F 12/0875* (2013.01);
  (Continued)

(58) Field of Classification Search
  CPC ........ G06F 9/38; G06F 9/30065; G06F 9/325; G06F 9/381
  See application file for complete search history.

(56) References Cited

U.S. PATENT DOCUMENTS 5,553,254 A * 9/1996 Berstis .................. G06F 9/3806
                                                                711/125
5,623,615 A    4/1997 Salem et al.
  (Continued)

FOREIGN PATENT DOCUMENTS

JP        H05-88891 A      4/1993

OTHER PUBLICATIONS

Official Action dated Jun. 7, 2016, issued in Japanese counterpart application No. JP 2013-069891 with English translation.

*Primary Examiner* — Christian P Chace
*Assistant Examiner* — Masud Khan
(74) *Attorney, Agent, or Firm* — Womble Carlyle

(57) ABSTRACT

A semiconductor device includes a memory for storing a plurality of instructions therein, an instruction queue which temporarily stores the instructions fetched from the memory therein, a central processing unit which executes the instruction supplied from the instruction queue, an instruction cache which stores therein the instructions executed in the past by the central processing unit, and a control circuit which controls fetching of each instruction. When the central processing unit executes a branch instruction, and an instruction of a branch destination is being in the instruction cache and an instruction following the instruction of the branch destination is stored in the instruction queue, the control circuit causes the instruction queue to fetch the instruction of the branch destination from the instruction cache and causes the instruction queue not to fetch the instruction following the instruction of the branch destination.

7 Claims, 18 Drawing Sheets

(52) U.S. Cl.
 CPC ........ *G06F 12/0862* (2013.01); *G06F 12/123* (2013.01); *G06F 2212/452* (2013.01); *Y02B 60/1225* (2013.01)

(56) References Cited

U.S. PATENT DOCUMENTS

| | | | | |
|---|---|---|---|---|
| 5,748,932 | A * | 5/1998 | Van Dyke | G06F 9/3804 711/100 |
| 2007/0113059 | A1 * | 5/2007 | Tran | G06F 9/325 712/241 |
| 2011/0055529 | A1 * | 3/2011 | McDonald | G06F 9/30054 712/238 |
| 2011/0238952 | A1 * | 9/2011 | Kai | G06F 9/30101 712/205 |
| 2011/0238953 | A1 * | 9/2011 | Metsugi | G06F 9/30101 712/207 |

* cited by examiner

FIG. 16

| STATE NAME | STATE IMMEDIATELY AFTER TRANSITION | OPERATION AT THE TIME OF BRANCH REQUEST | | |
|---|---|---|---|---|
| | | HIT TO MRU ENTRY OF BRANCH CACHE | HIT TO OTHER THAN MRU ENTRY OF BRANCH CACHE | CACHE MISS |
| INV | OUTSIDE RANGE OF SHORT LOOP | CACHE → ENTRIES 0 AND 1<br>W = 2, R = 0<br>ADDRESS SWITCHING OF FETCH DESTINATION | CACHE → ENTRIES 0 AND 1<br>W = 2, R = 0<br>ADDRESS SWITCHING OF FETCH DESTINATION | RESET INSTRUCTION QUEUE<br>W = 0, R = 0<br>ADDRESS SWITCHING OF FETCH DESTINATION |
| VLD1 | ONLY ENTRY 0 OR ENTRIES 0 AND 1 OF QUEUE ARE VALID | CACHE → ENTRIES 0 AND 1<br>W = 2, R = 0<br>ADDRESS SWITCHING OF FETCH DESTINATION | CACHE → ENTRIES 0 AND 1<br>W = 2, R = 0<br>ADDRESS SWITCHING OF FETCH DESTINATION | RESET INSTRUCTION QUEUE<br>W = 0, R = 0<br>ADDRESS SWITCHING OF FETCH DESTINATION |
| VLD2 | ENTRIES 0 THROUGH 2 OF QUEUE ARE VALID ENTRY 2 IS NOT UPDATED TWICE | CACHE → ENTRIES 0 AND 1<br>W = 3, R = 0<br>ADDRESS SWITCHING OF FETCH DESTINATION | CACHE → ENTRIES 0 AND 1<br>W = 2, R = 0<br>ADDRESS SWITCHING OF FETCH DESTINATION | RESET INSTRUCTION QUEUE<br>W = 0, R = 0<br>ADDRESS SWITCHING OF FETCH DESTINATION |
| VLD3 | ENTRIES 0 THROUGH 3 OF QUEUE ARE VALID ENTRY 2 IS NOT UPDATED TWICE | CACHE → ENTRIES 0 AND 1<br>W = 4, R = 0<br>ADDRESS SWITCHING OF FETCH DESTINATION | CACHE → ENTRIES 0 AND 1<br>W = 2, R = 0<br>ADDRESS SWITCHING OF FETCH DESTINATION | RESET INSTRUCTION QUEUE<br>W = 0, R = 0<br>ADDRESS SWITCHING OF FETCH DESTINATION |

FIG. 17

PROGRAM EXAMPLE

| ADDRESS | INSTRUCTION STRING | CODE OF INSTRUCTION | INSTRUCTION FETCH REQUEST |
|---|---|---|---|
| 0500H | BRA label | BRA | |
| | label: | | |
| 1000H | NOP | A1 | A |
| 1008H | NOP | A2 | |
| 1010H | NOP | B1 | B |
| 1018H | NOP | B2 | |
| 1020H | NOP | C1 | C |
| 1028H | NOP | C2 | |
| 1030H | NOP | D1 | D |
| 1038H | NOP | D2 | |
| 1040H | NOP | E1 | E |
| 1048H | NOP | E2 | |
| 1050H | NOP | F1 | F |
| 1058H | NOP | F2 | |

FIG. 20

PROGRAM EXAMPLE OF SHORT LOOP

| ADDRESS | INSTRUCTION STRING | CODE OF INSTRUCTION | INSTRUCTION FETCH REQUEST |
|---|---|---|---|
| | label: | | |
| 1000H | NOP | A1 | A |
| 1008H | NOP | A2 | |
| 1010H | NOP | B1 | B |
| 1018H | NOP | B2 | |
| 1020H | BRA label | BRA | C |
| 1028H | NOP | C2 | |
| 1030H | NOP | D1 | D |
| 1038H | NOP | D2 | |
| 1040H | NOP | E1 | E |
| 1048H | NOP | E2 | |
| 1050H | NOP | F1 | F |
| 1058H | NOP | F2 | |

FIG. 21 OPERATION AT THE TIME OF SHORT LOOP

SYSTEM AND METHOD FOR UPDATING AN INSTRUCTION CACHE FOLLOWING A BRANCH INSTRUCTION IN A SEMICONDUCTOR DEVICE

CROSS-REFERENCE TO RELATED APPLICATIONS

The disclosure of Japanese Patent Application No. 2013-069891 filed on Mar. 28, 2013 including the specification, drawings and abstract is incorporated herein by reference in its entirety.

BACKGROUND

The present invention relates to a semiconductor device equipped with a central processing unit (CPU) which executes each instruction fetched from a memory, and is, for example, suitably used for a semiconductor device equipped with an instruction queue for temporarily storing a fetched instruction and an instruction cache for storing an instruction executed in the past.

Recently, a microprocessor system has increased a delay of memory access with improvements in its performance due to improvements in clock frequency and the like and has thus become a bottleneck of a system performance improvement. In order to reduce this delay, a common microprocessor system has hidden the delay of the memory access by being equipped with an instruction queue and/or a cache memory.

The instruction queue is capable of reducing a delay due to an instruction fetch by fetching (prefetching) an instruction in advance and holding it before a CPU decodes an instruction code. The cache memory is capable of reducing a delay in the case of access being made to the same address again by holding an instruction and data of an address accessed once in a small memory.

As a document that has disclosed a processor equipped with an instruction queue and a cache memory, there is cited, for example, a Patent Document 1. The processor of this document has further been provided with a branch prediction circuit that predicts a branch destination address from storage addresses of branch instructions.

RELATED ART DOCUMENTS

Patent Document

[Patent Document 1] Japanese Unexamined Patent Publication No. Hei 5(1993)-88891

SUMMARY

In a recent microprocessor system, an increase in power consumption caused by an improvement in clock frequency and an increase in chip area also has become a problem. Particularly when the system is equipped with a large capacity memory, there is a tendency that power consumed in the memory accounts for a significant ratio to the whole chip. It has therefore been known that reducing memory access is effective in reducing power.

It has commonly been conducted so far by a processor system using an instruction queue to reset the instruction queue and fetch an instruction of a branch destination from a memory to the instruction queue when a branch instruction is executed.

Since, however, the instruction code of the branch destination remains in the instruction queue upon execution of the branch instruction in the case of loop processing (hereinafter called "short loop processing") configured by repetition of an instruction code string equivalent to about the size of the instruction queue, it is not necessary to reset the instruction queue. Nevertheless, when the instruction queue is reset to fetch the instruction code from the memory again, extra power is consumed by such access to the memory.

Other objects and novel features of the present invention will become apparent from the description of the present specification and the accompanying drawings.

There is provided a semiconductor device according to one aspect of the present invention. In the semiconductor device, when a CPU executes a branch instruction, and an instruction of a branch destination is stored in an instruction cache and an instruction following the instruction of the branch destination is being stored in an instruction queue, the instruction of the branch destination is fetched from the instruction cache to the instruction queue, and the instruction following the instruction of the branch destination is not fetched into the instruction queue to reuse it.

According to the above one aspect, when short loop processing is taken, an instruction code remaining in the instruction queue is reused to make it possible to optimize power consumption.

BRIEF DESCRIPTION OF THE DRAWINGS

FIG. 16 is a diagram showing in tabular form, control operations at the time of branch requests in respective states of FIG. 15;

FIG. 17 is a diagram illustrating an example of a program not for a short loop;

FIG. 20 is a diagram illustrating an example of a program for a short loop;

DETAILED DESCRIPTION

Figure 1:
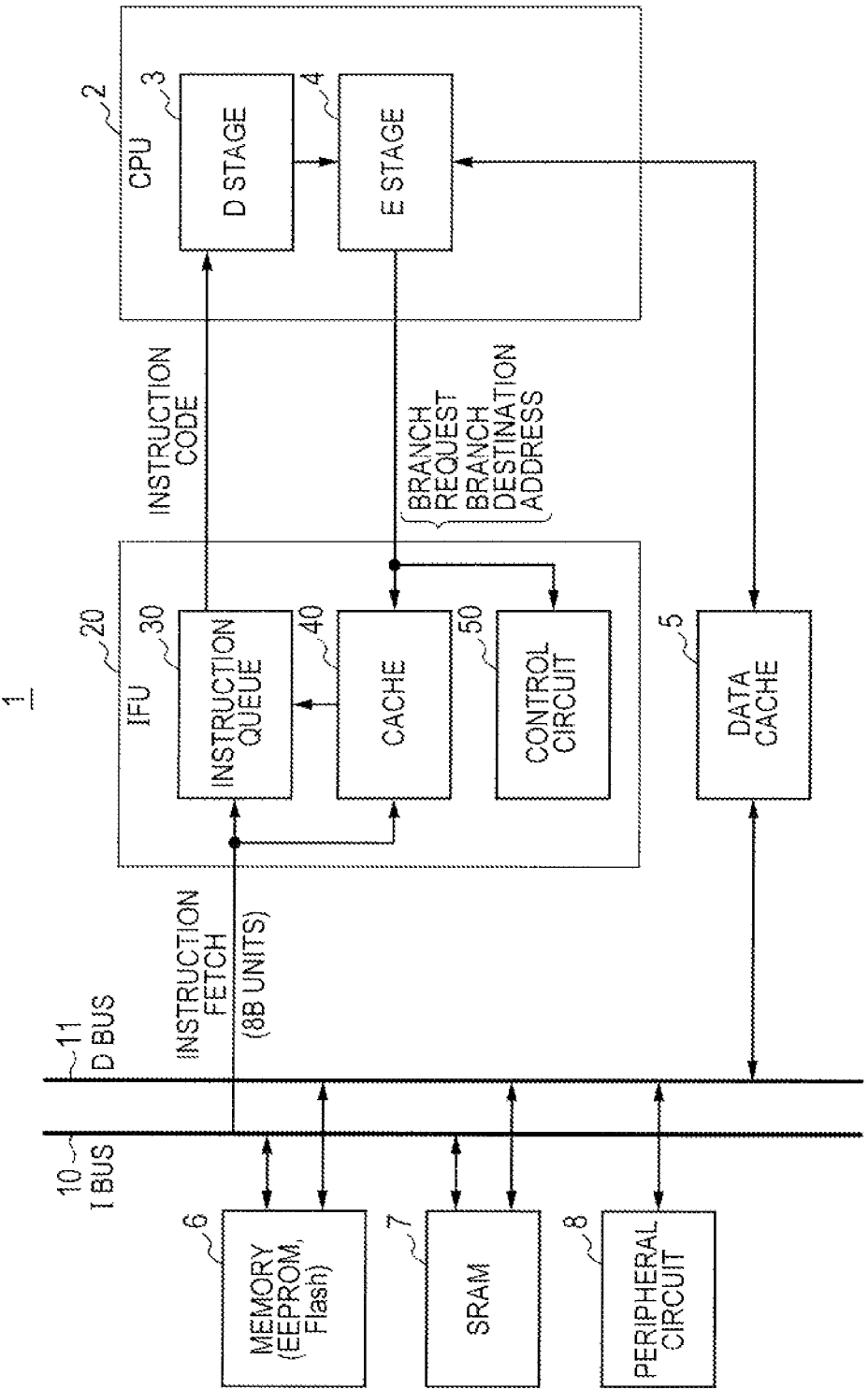
FIG. 1 is a block diagram showing a configuration of a microprocessor used as a semiconductor device according to a first embodiment.

Embodiments will hereinafter be described in detail with reference to the accompanying drawings. Incidentally, the same reference numerals are respectively attached to the same or corresponding components, and their description will not be repeated.

First Embodiment

Overall Configuration of Microprocessor

FIG. 1 is a block diagram showing a configuration of a microprocessor used as a semiconductor device according to a first embodiment. The semiconductor device is comprised of a single semiconductor chip formed with an integrated circuit at its main surface, and the microprocessor is realized by the integrated circuit. Referring to FIG. 1, the microprocessor 1 includes a central processing unit (CPU) 2, an instruction fetch unit (IFU) 20, a data cache memory 5, a memory 6 (EEPROM—Electrically Erasable Programmable Read-Only Memory or Flash Memory or the like), a SRAM (Static Random Access Memory) 7, and a peripheral circuit 8. The instruction fetch unit 20 is coupled to the memory 6 and the SRAM 7 through an instruction bus 10. The data cache memory 5 is coupled to the memory 7, the SRAM 7 and the peripheral circuit 8 through a data bus 11 and holds data once used in the CPU 2 for reuse.

The CPU 2 fetches an instruction code from the main storage memory (memory 6 and SRAM 7) through the instruction fetch unit 20. The CPU 2 is coupled to the instruction fetch unit 20 by a bus of 8 B (Byte)(8 B=64 b (bits)) width. The CPU 2 is capable of pipeline processing and decodes the fetched instruction code at a D (Decode) stage 3 and executes it at an E (Execute) stage 4. In the microprocessor 1 of the first embodiment, one cycle is assumed to be taken for each stage processing. Incidentally, a description will hereinafter be made assuming that an instruction is fetched from the memory 6 in which an access speed becomes a problem.

The instruction fetch unit 20 includes an instruction queue 30, an instruction cache memory 40, and a control circuit 50 that controls fetching of instructions. The instruction queue 30 prefetches an instruction before the CPU 2 decodes an instruction code, and temporarily holds the same therein. The instruction cache memory 40 holds an instruction of a branch destination when a branch instruction code is executed, thereby reducing penalty due to an instruction fetch when the same branch instruction code is executed again.

When the branch instruction code is executed, the CPU 2 outputs a branch request and a branch destination address to the instruction cache memory 40 and control circuit 50 (to be described later) in the instruction fetch unit 20. When the instruction cache memory 40 receives the branch request therein, it retrieves an instruction corresponding to the branch destination address. When the corresponding instruction is present in the instruction cache memory 40 (the instruction is hit), the instruction queue 30 receives the transfer of an instruction code from the hit entry of the instruction cache memory 40 without performing fetching of each instruction from the memory 6. When the instruction corresponding to the branch destination address is not present in the instruction cache memory 40 (miss), the instruction queue 30 performs fetching on the main storage memory (memory 6) and registers an instruction code for a branch destination therein and registers it in the instruction cache memory 40.

Figure 2:
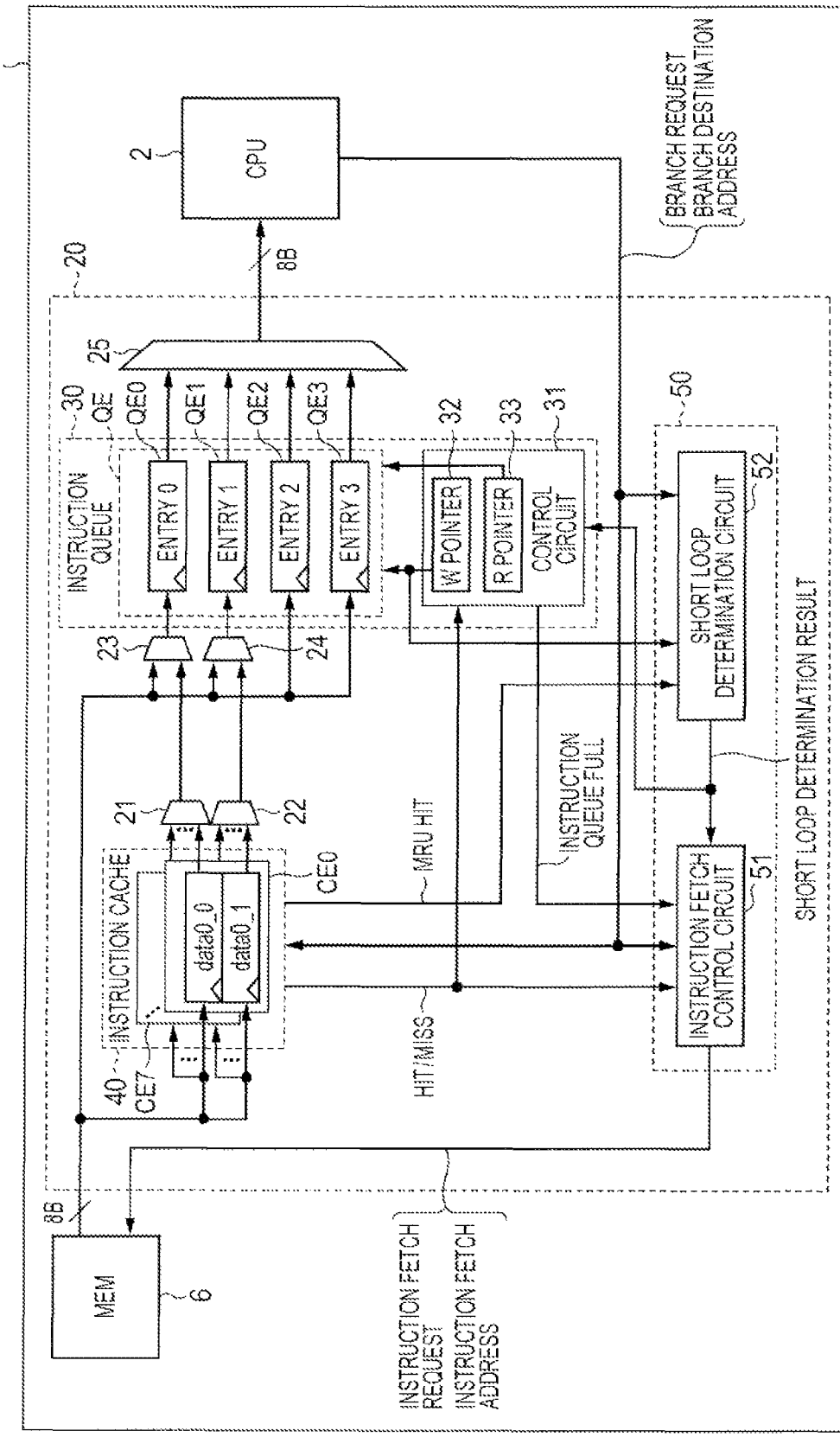
FIG. 2 is a block diagram illustrating a more detailed configuration of an instruction fetch unit of FIG. 1.

FIG. 2 is a block diagram showing a more detailed configuration of the instruction fetch unit of FIG. 1. Referring to FIG. 2, the instruction queue 30 includes four entries of 0 (QE0) through 3 (QE3). Each entry has a size of 8 B (Bytes) and is coupled to the memory 6 by a bus of 8 B. Instruction fetching from the memory 6 is done in 8-byte units (1 or plural instructions are fetched at a time corresponding to instruction widths of respective instruction codes). The fetched instructions are registered in their corresponding entries of the instruction queue in order of entry numbers. After the instruction fetched into the entry 3 (QE3) has been registered, the entry 0 (QE0) is updated. However, until an instruction stored in a given entry is transferred to the CPU and decoded, an instruction fetch for updating the entry is not performed. A selector 25 is provided to select an entry of a transfer source of an instruction code to the CPU 2.

In order to control an instruction fetch for the instruction queue 30 and the transfer of the instruction code to the CPU 2, a control circuit of the instruction queue 30 is provided with a write pointer (W pointer) 32, and a read pointer (R pointer) 33. The write pointer 32 stores an integer W circulating from 0 to 7 therein. Assuming that the remainder of dividing the integer W by 4 (more generally, the total entry number N of the instruction queue 30) is w (W modulo N), the instruction fetched from the memory 6 is written into its corresponding entry w (QEw) of the instruction queue 30. The read pointer 33 also stores an integer R circulating from 0 to 7 therein in like manner. Assuming that the remainder of dividing the integer R by 4 (more generally, the total entry number N of the instruction queue 30) is r (R modulo N), the instruction code stored in the entry r (QEr) of the instruction queue 30 is transferred to the CPU 2, where it is decoded and executed. The maximum value of the value W of the write pointer 32 and the maximum value of the value R of the read pointer 33 are respectively set to 7 in order to determine where all entries of the instruction queue 30 are effective (i.e., where the transfer to the CPU 2 is not completed at any entry). This case is hereinafter referred to as "Instruction Queue Full". When the absolute value of the difference between the value W of the write pointer 32 and the value R of the read pointer 33 is equal to 4 (i.e., the total entry number N of the instruction queue 30), it is determined to be a state of Instruction Queue Full.

The instruction cache memory 40 includes eight entries of 0 (CE0) to 7 (CE7). Each entry has a size of 16 B and stores therein instructions corresponding to the two entries of the instruction queue 30. The instruction cache memory 40 is taken to be an LRU (Least Recently Used) replacement method of a full associative mapping system. When instructions corresponding to a branch destination address are stored in a given entry of the instruction cache memory 40 and a branch instruction is executed by the CPU 2, the instructions stored in the entry are selected by selectors 21 and 22 and transferred to their corresponding entries 0 and 1 (QE0 and QE1) of the instruction queue 30. Selectors 23 and 24 for selecting whether to fetch instructions from the memory 6 or fetch instructions from the instruction cache memory 40 are provided on the input sides of the entries 0 and 1 (QE0 and QE1) of the instruction queue 30.

A description will hereinafter be made of an outline of instruction fetch control.

Outline of Instruction Fetch Control

Figure 3:
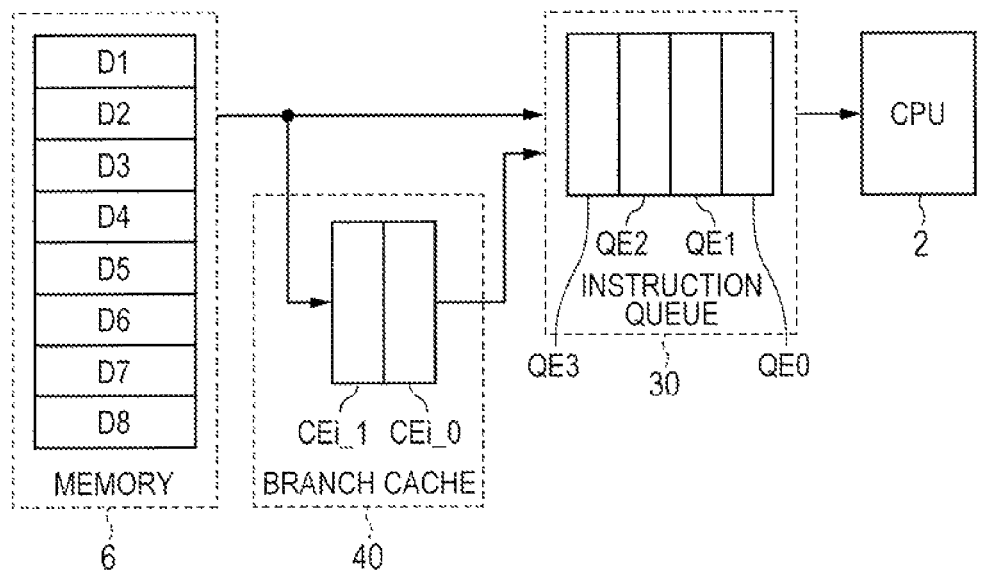
FIG. 3 is a diagram for describing an outline of instruction fetch control.

FIG. 3 is a diagram for describing the outline of the instruction fetch control. As shown in FIG. 3, instruction data D1 through D8 are assumed to have been stored in the memory 6 in 8 B units.

Figure 4:
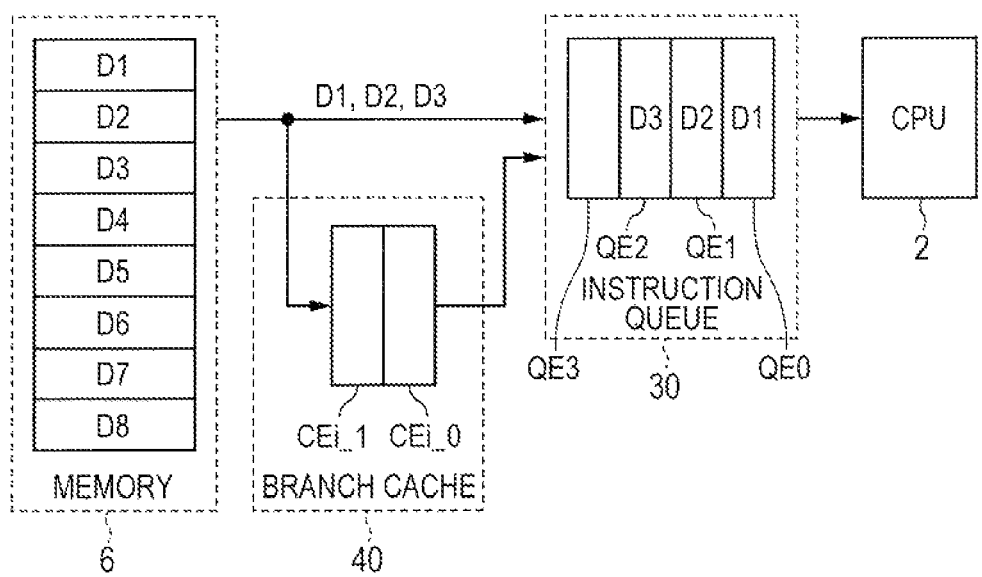
FIG. 4 is a diagram for describing an outline of an instruction fetch at the start of program execution.

1. At the start of execution of program:

FIG. 4 is a diagram for describing an outline of an instruction fetch at the start of program execution. Referring to FIG. 4, instruction data D1, D2 and D3 fetched from the memory 6 are stored in order of the entries 0 (QE0) to 2 (QE2) of the instruction queue 30.

Figure 5:
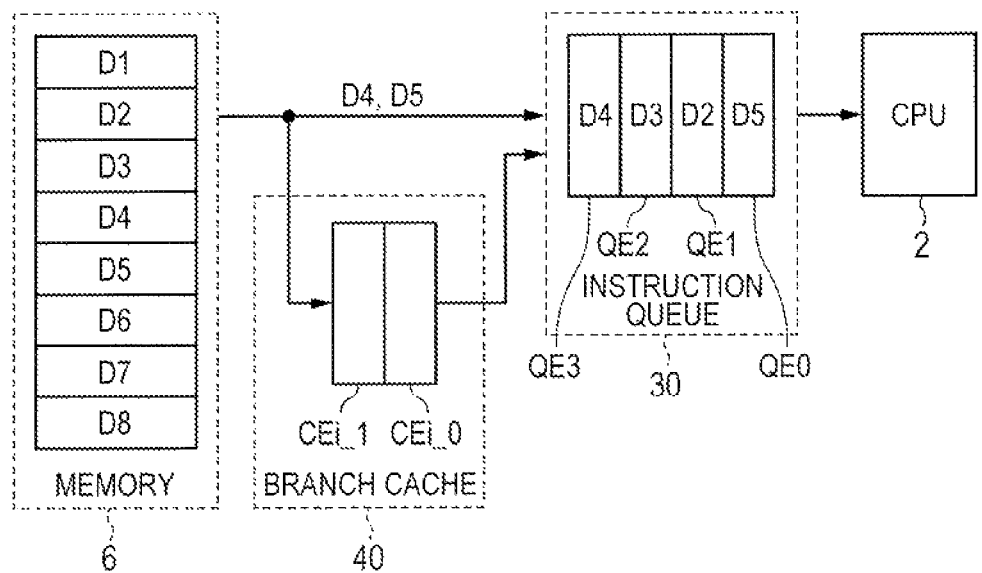
FIG. 5 is a diagram showing a state following FIG. 4.

FIG. 5 is a diagram showing a state following FIG. 4. Referring to FIG. 5, the instruction data D5 is stored in the entry 0 (QE0) after the instruction data D4 has been stored in the entry 3 (QE3). It is however necessary that before the entry 0 (QE0) is updated, the transfer of all instruction codes stored in the entry 0 (QE0) to the CPU 2 has been completed.

Figure 6:
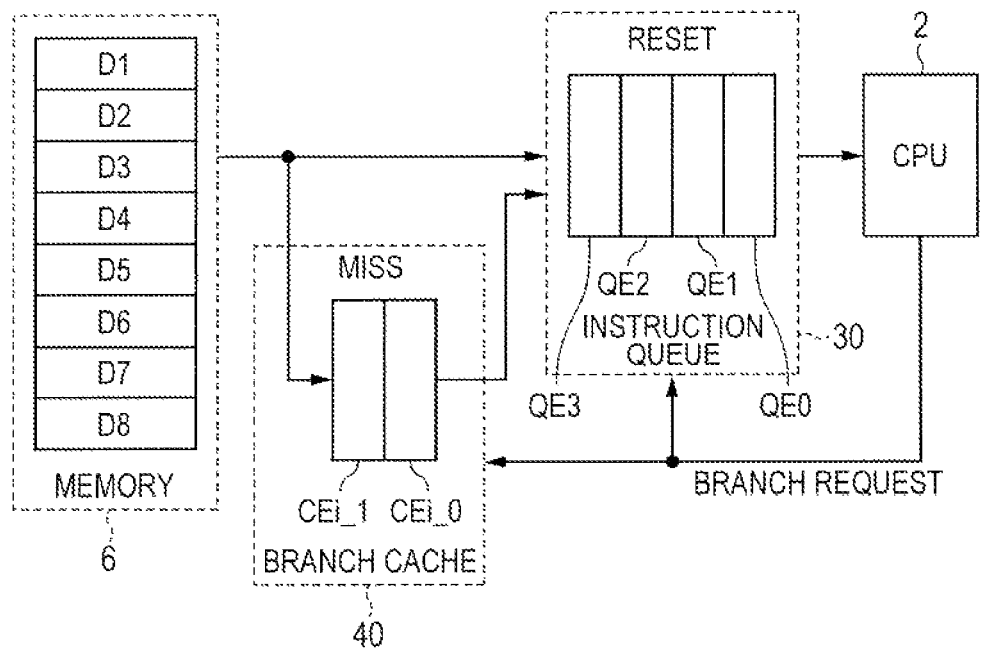
FIG. 6 is a diagram for describing where an instruction of a branch destination is not stored in an instruction cache memory upon execution of a branch instruction.

2. At the execution of branch instruction (in the case of miss):

FIG. 6 is a diagram for describing where an instruction of a branch destination is not stored in the instruction cache memory upon the execution of a branch instruction. Referring to FIG. 6, a branch request is outputted from the CPU 2 at the time of execution of the branch instruction. When the instruction of the branch destination is not stored in the instruction cache memory 40 at that time (in the case of a miss), the instruction queue 30 is reset.

Figure 7:
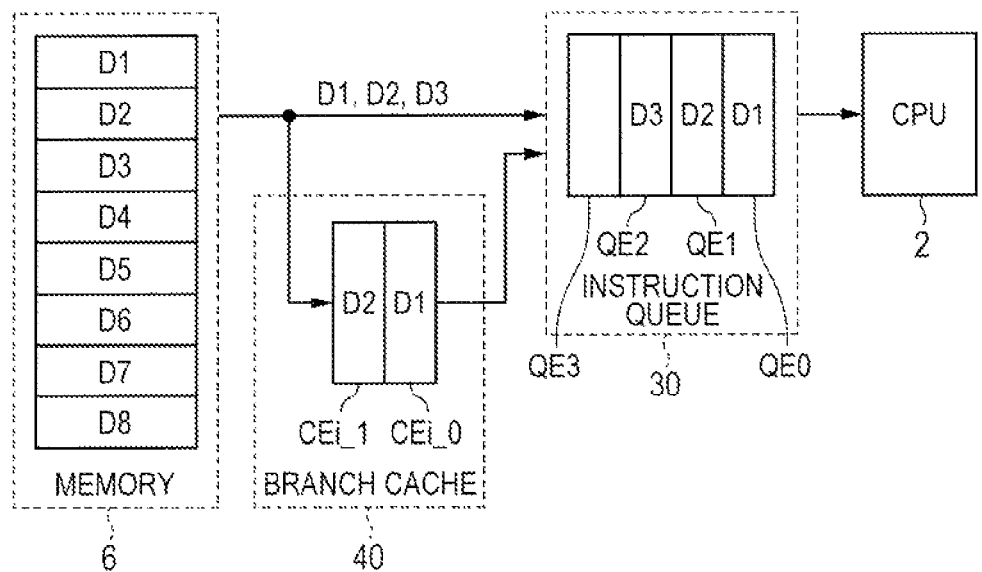
FIG. 7 is a diagram illustrating a state following FIG. 6.

FIG. 7 is a diagram showing a state following FIG. 6. Referring to FIG. 7, in the case of a cache miss, an instruction fetch is started from the instruction code that enters into the entry 0 (QE0) of the instruction queue 30. The first instruction data D1 for the instruction fetch is held in both of the entry 0 (QE0) of the instruction queue 30 and 8 B (CEi_0) of the first half of an entry i (LRU entry) of the instruction cache memory 40. The second instruction data D2 for the instruction fetch is held in both of the entry 1 (QE1) of the instruction queue 30 and 8 B (CEi_1) of the latter half of the entry i (LRU entry) of the instruction cache memory 40.

Figure 8:
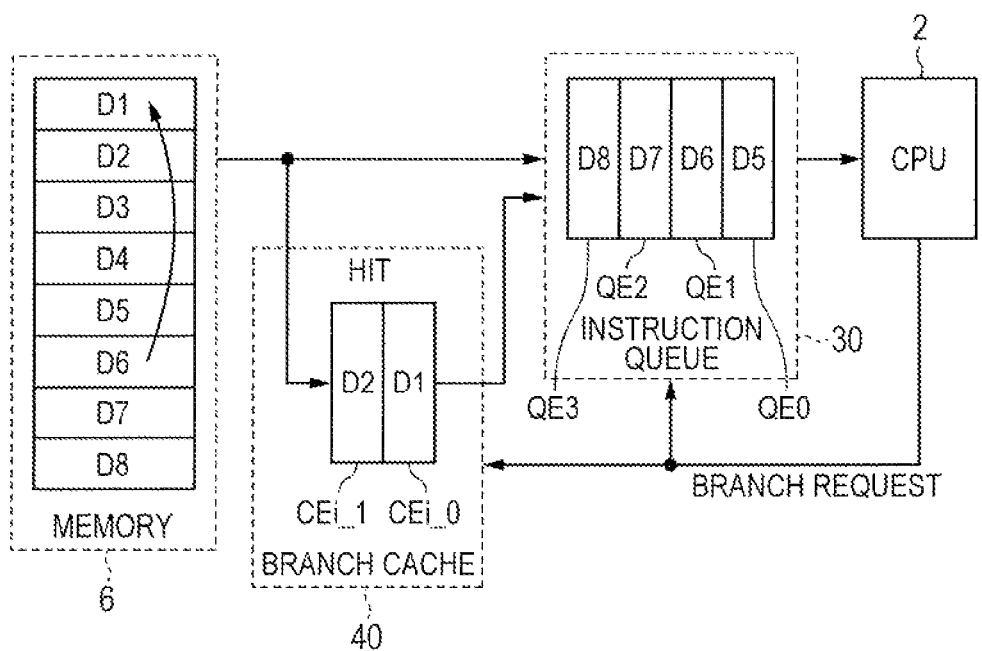
FIG. 8 is a diagram for describing where an instruction of a branch destination is being stored in the instruction cache memory upon execution of a branch instruction (when not in the case of short loop)

3. At the execution of branch instruction (when hit and not in the case of short loop):

FIG. 8 is a diagram for describing where an instruction of a branch destination is being stored in the instruction cache memory at the branch instruction execution (not in the case of a short loop). FIG. 8 shows where the branch instruction (included in the instruction data D6) stored in the entry 1 (QE1) of the instruction queue 30 is executed by the CPU 2. In this case, the instruction of the branch destination (included in the instruction data D1) is assumed to have been stored in the first half (CEi_0) of the entry i of the instruction cache memory 40.

Figure 9:
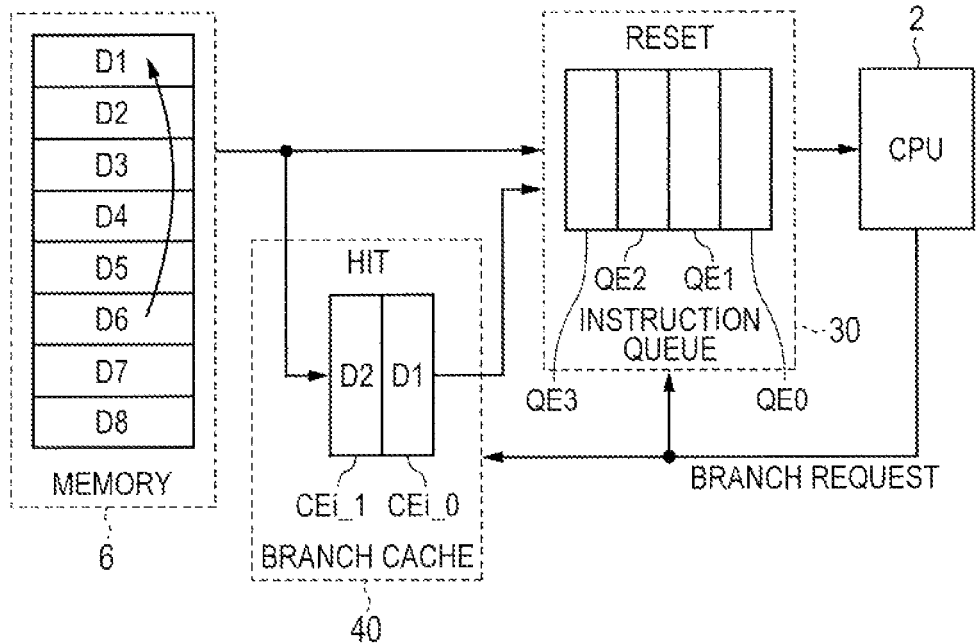
FIG. 9 is a diagram showing a state following FIG. 8.

FIG. 9 is a diagram showing a state following FIG. 8. Referring FIG. 9, when an instruction of a branch destination has been stored in the entry i (CE_i) of the instruction cache memory 40 (when hit), the instruction data D1 and D2 corresponding to 16 B of the hit entry i (CE_i) are transferred to their corresponding entries 0 and 1 (QE0 and QE1) of the instruction queue 30.

Figure 10:
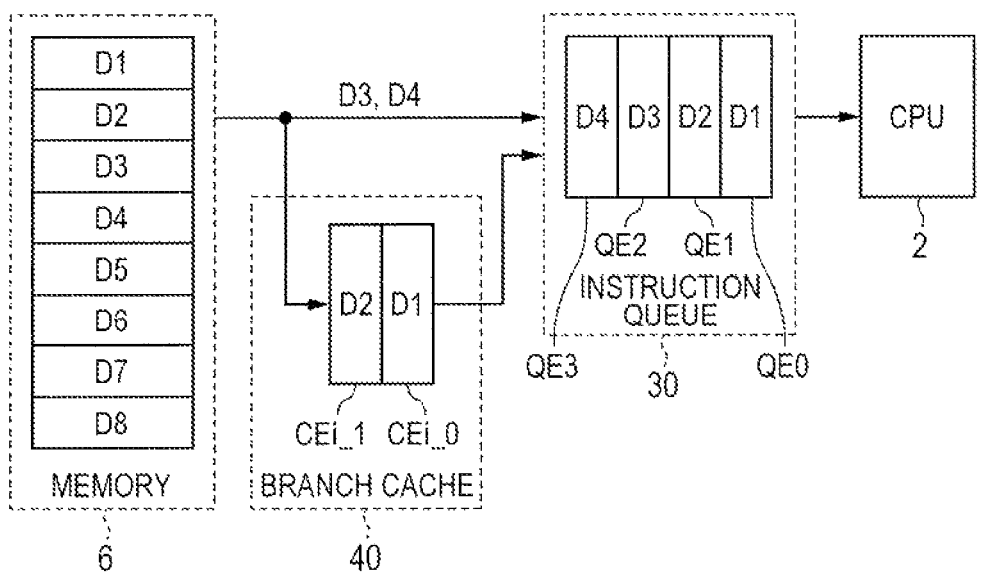
FIG. 10 is a diagram depicting a state following FIG. 9.

FIG. 10 is a diagram showing a state following FIG. 9. Referring to FIG. 10, the subsequent instructions (instruction data D3 and D4) are fetched from the memory 6 and stored in their corresponding entries 2 and 3 (QE2 and QE3) of the instruction queue 30.

Figure 11:
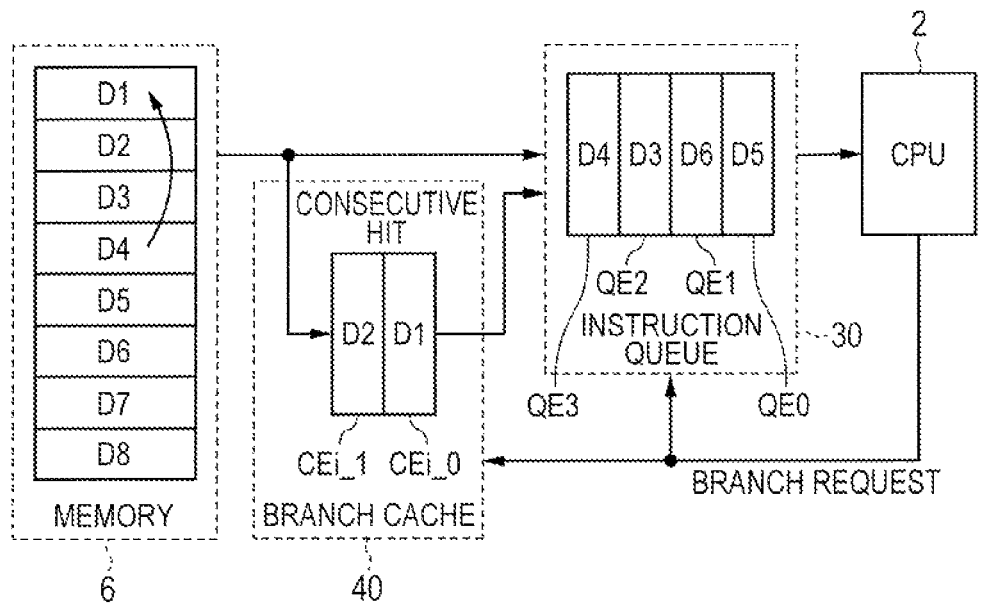
FIG. 11 is a diagram for describing where an instruction of a branch destination is being stored in the instruction cache memory upon execution of a branch instruction (in the case of short loop)

4. At the execution of branch instruction (when hit and in the case of short loop):

FIG. 11 is a diagram for describing where an instruction of a branch destination is being stored in the instruction cache memory at the branch instruction execution (in the case of a short loop). FIG. 11 shows where the branch instruction (included in the instruction data D4) stored in the entry 3 (QE2) of the instruction queue 30 is executed by the CPU 2. In this case, the instruction of the branch destination (included in the instruction data D1) is assumed to have been stored in the first half (CEi_0) of the MRU (Most Recently Used) entry i of the instruction cache memory 40.

Figure 12:
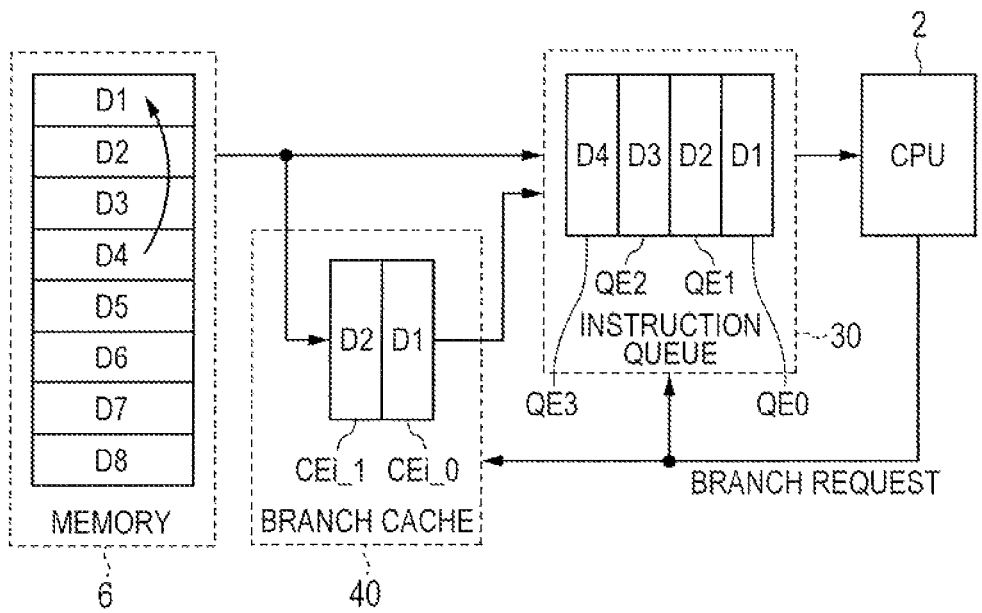
FIG. 12 is a diagram showing a state following FIG. 11.

FIG. 12 is a diagram showing a state following FIG. 11. Referring to FIG. 12, when an instruction of a branch destination is stored in the MRU entry i (each of CEi_0 and CEi_1) of the instruction cache memory 40 (i.e., when consecutively hit), the instruction data D1 and D2 corresponding to 16 B of the hit MRU entry i (CEi_0 and CEi_1) are transferred to their corresponding entries 0 and 1 (QE0 and QE1) of the instruction queue 30. In FIG. 12, however, the instructions (instruction data D3 and D4) following the instruction of the branch destination (each of instruction data D1 and D2) have been stored in their corresponding entries 2 and 3 (QE2 and QE3) of the instruction queue 30. In the case of such a short loop, no instructions are fetched into the entries 2 and 3 (QE2 and QE3) of the instruction queue 30 from the memory 6, and the instructions stored in the entries 2 and 3 (QE2 and QE3) are reused.

Figure 13:
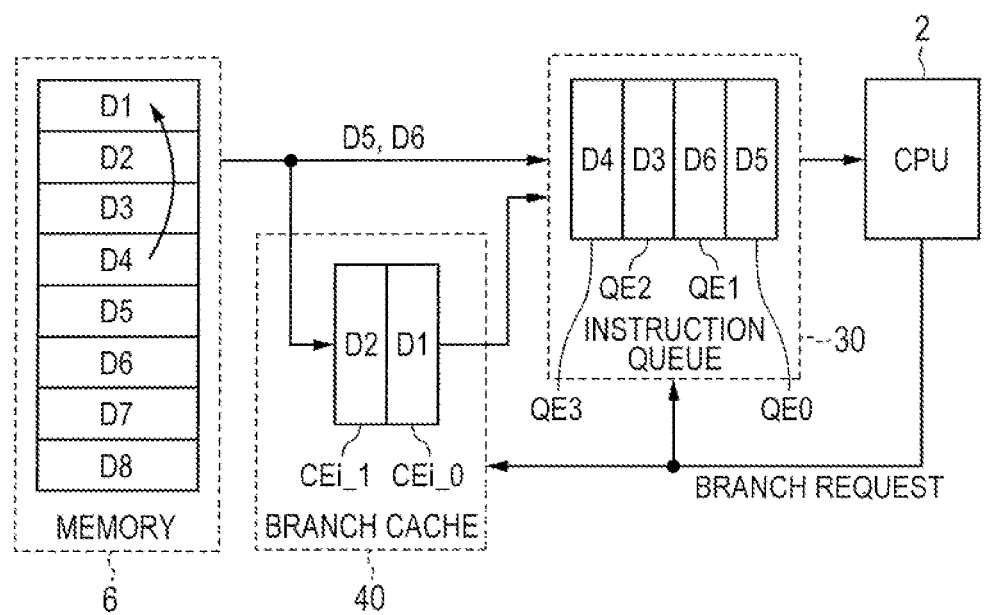
FIG. 13 is a diagram illustrating a state following FIG. 12.

FIG. 13 is a diagram showing a state following FIG. 12. Referring to FIG. 13, the instructions (instruction data D5 and D6) following the instruction data D3 and D4 are fetched from the memory 6 and stored in their corresponding entries 0 and 1 (QE0 and QE1) of the instruction queue 30. It is however necessary that before the entries 0 and 1 (QE0 and QE1) are updated, the transfer of all instruction codes stored in the entries 0 and 1 (QE0 and QE1) to the CPU 2 respectively has been completed.

Details of Instruction Fetch Control

Referring to FIG. 2 again, the details of instruction fetch control by the control circuit 50 will be described. The control circuit 50 of the instruction fetch unit 20 includes an instruction fetch control circuit 51 and a short loop determination circuit 52.

A branch destination address is outputted to the instruction cache memory 40 at the branch request from the CPU 2. The instruction cache memory 40 retrieves an instruction corresponding to the branch destination address and outputs a retrieval result (hit/miss) to the control circuit 31 of the instruction queue 30 and the instruction fetch control circuit 51. Further, the instruction cache memory 40 outputs information as to whether to hit an MRU entry to the short loop determination circuit 52.

When the branch request is received from the CPU 2, whether to correspond to the above short loop is determined by the short loop determination circuit 52 based on the information as to whether to hit the MRU entry of the instruction cache memory 40 and the value of the W pointer.

The instruction fetch control circuit 51 outputs an instruction fetch request to the main storage memory (memory 6) along with an instruction fetch address. When the CPU 2 outputs a branch request, the instruction fetch control circuit 51 outputs an address (instruction fetch address) at which an instruction to be next fetched into the instruction queue 30 is being stored, to the memory (MEM) 6 along with an instruction fetch request, based on the information as to whether the branch destination address is hit to the instruction cache memory 40, the result of determination as to whether the short loop is taken, and the branch destination address. In the case of "instruction queue full", however, the instruction fetch control circuit 51 stops the output of the instruction fetch request and the instruction fetch address to the memory 6 (i.e., the instruction fetch is stopped).

Figure 14:
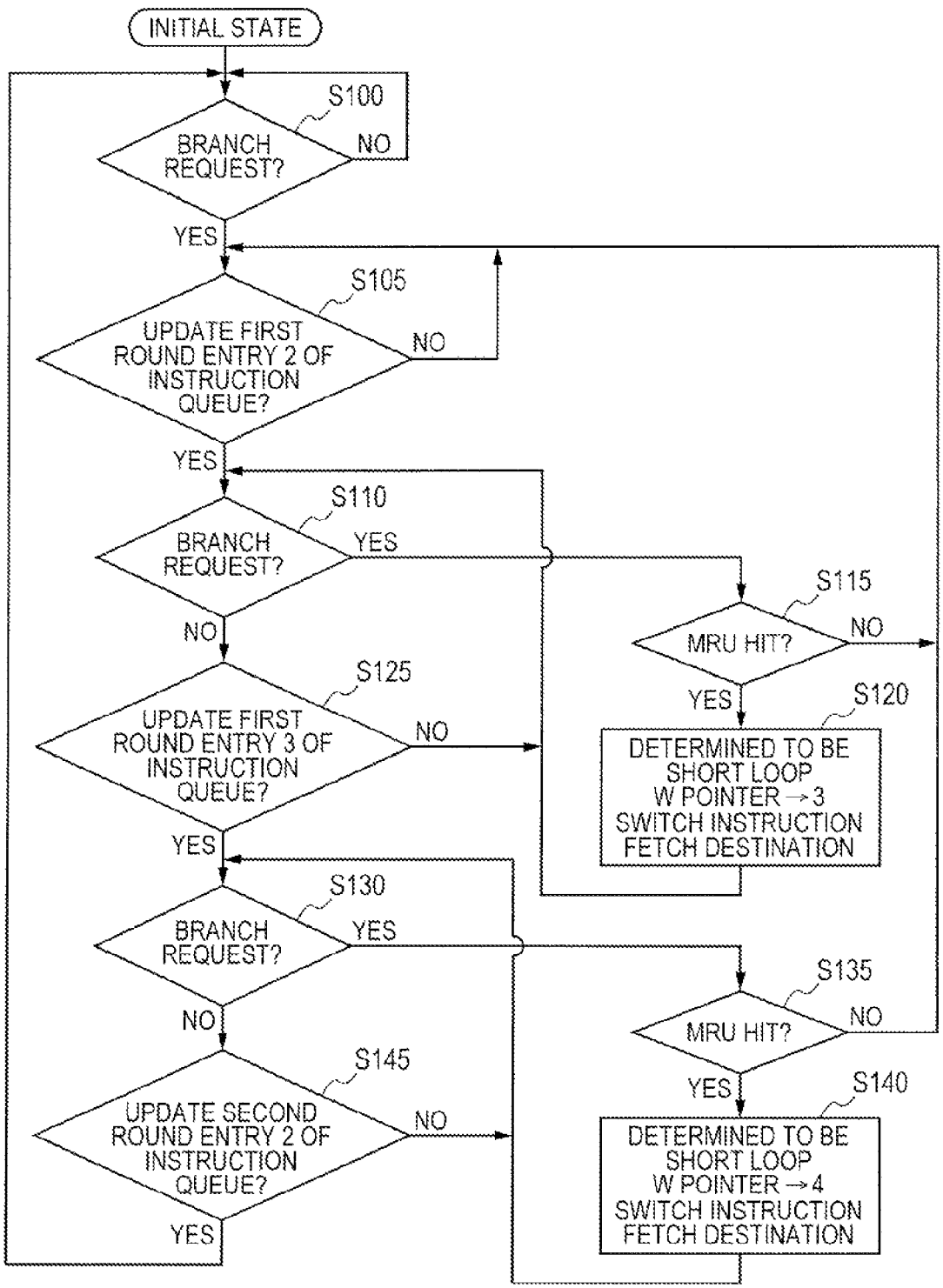
FIG. 14 is a flowchart showing a determination procedure of a short loop determination circuit of FIG. 2.

FIG. 14 is a flowchart showing a determination procedure of the short loop determination circuit of FIG. 2. Referring to FIGS. 2 and 14, suppose that as a result of executing a branch instruction by the CPU 2 in an initial state after the start of a program, a branch request is outputted from the CPU 2 (YES at Step S100). Then, as the result of this, the instructions are supposed to be fetched from the memory 6 between the entries 0 (QE0) and 2 (QE2) of the instruction queue 30 (YES at Step S105).

When in the state of YES at Step S105, the branch request is outputted from the CPU 2 again and the MRU entry is hit as a result of retrieval by the instruction cache memory 40 (YES at Step S110 and YES at Step S115), the short loop determination circuit 52 makes a decision of corresponding to the short loop (Step S120). At this time, the value W of the write pointer of the instruction queue 30 is set to 3, and the value R of the read pointer is set to 0. The instruction fetch control circuit 51 switches an instruction fetch address in such a manner that an instruction following the instruction stored in the entry 2 is fetched from the memory 6. On the other hand, when the MRU entry is not hit as a result of retrieval by the instruction cache memory 40 although the branch request is outputted from the CPU 2 in the state of YES at Step S105 (YES at Step S110 and NO at Step S115), the short loop determination circuit 52 makes a decision of not corresponding to the short loop and the processing is returned to Step S105.

Next, assume that an instruction is further fetched into its corresponding entry 3 (QE3) of the instruction queue 30 from the memory 6 in the state of YES at above Step S105 (YES at Step S125).

When a branch request is outputted from the CPU 2 in the state of YES at Step S125, and the MRU entry is hit as the retrieval result of the instruction cache memory 40 (YES at Step S130 and YES at Step S135), the short loop determination circuit 52 makes a decision of corresponding to the short loop (Step S140). At this time, the value W of the write pointer in the instruction queue 30 is set to 4, and the value R of the read pointer therein is set to 0. The instruction fetch control circuit 51 switches an instruction fetch address in such a manner that an instruction following the instruction stored in the entry 3 is fetched from the memory 6. On the other hand, when the MRU entry is not hit as a result of retrieval by the instruction cache memory 40 although the branch request is issued from the CPU 2 in the state of YES at Step S125 (YES at Step S130 and NO at Step S135), a decision of not corresponding to the short loop is made and the processing is returned to Step S105.

Next, assume that instructions are further fetched into their corresponding entries 0 (QE0) to 2 (QE2) of the instruction queue 30 from the memory 6 in the state of YES at above Step S125 (i.e., renewal of the second round entry 2) (YES at Step S145). In this case, a decision is made to fall outside the scope of the short loop, and the processing is returned to the initial state (Step S100).

The above is more generally summarized as follows: The following is made based on the premise that the instruction queue 30 includes N (where N≥2) entries and fetches instructions from the memory 6 in entry units. Assume that the instruction cache memory 40 includes a plurality of entries and the respective entries of the instruction cache store therein instructions corresponding to M (where M<N) entries being some entries of the instruction queue (where N=4 and M=2 in the example of FIG. 14).

First, when the CPU 2 executes a branch instruction and the instruction of the branch destination is hit to any entry of the instruction cache memory 40, the instruction is fetched into each of the first to Mth entries of the instruction queue 30 from the hit entry of the instruction cache memory 40.

When the CPU 2 has executed the branch instruction, the short loop determination circuit 52 further determines whether a reutilizable condition is being satisfied that the instruction stored in each of the M+1th to Pth (where M<P≤N) entries of the instruction queue 30 is not yet transferred to the CPU 2 after the branch instruction has been executed at the previous time, or it is not updated by another instruction being fetched from the memory 6 after the instruction has been transferred to the CPU 2. Then, when the instruction of the branch destination is hit to the MRU entry of the instruction cache memory 40 and the above reutilizable condition is being satisfied where the branch instruction is outputted from the CPU 2, the short loop determination circuit 52 makes a decision of corresponding to the short loop. In this case, the instruction fetch control circuit 51 allows the instructions not to be fetched into the M+1th to Pth entries of the instruction queue 30 from the memory 6 in order to reuse the same by the CPU 2 (instructions are fetched into the P+1th to Nth entries from the memory 6). On the other hand, when the short loop is not taken, the instruction fetch control circuit 51 causes the instructions to be fetched into the M+1th to Nth entries of the instruction queue 30 from the memory 6.

Configuration of State Machine

In order to make a decision as to whether to correspond to the short loop as described above, there is a need to manage whether the reutilizable instruction codes are being held in the entries 2 and 3 (QE2 and QE3) of the instruction queue 30. It is therefore desirable that the short loop determination circuit 52 is configured as a state machine.

Figure 15:
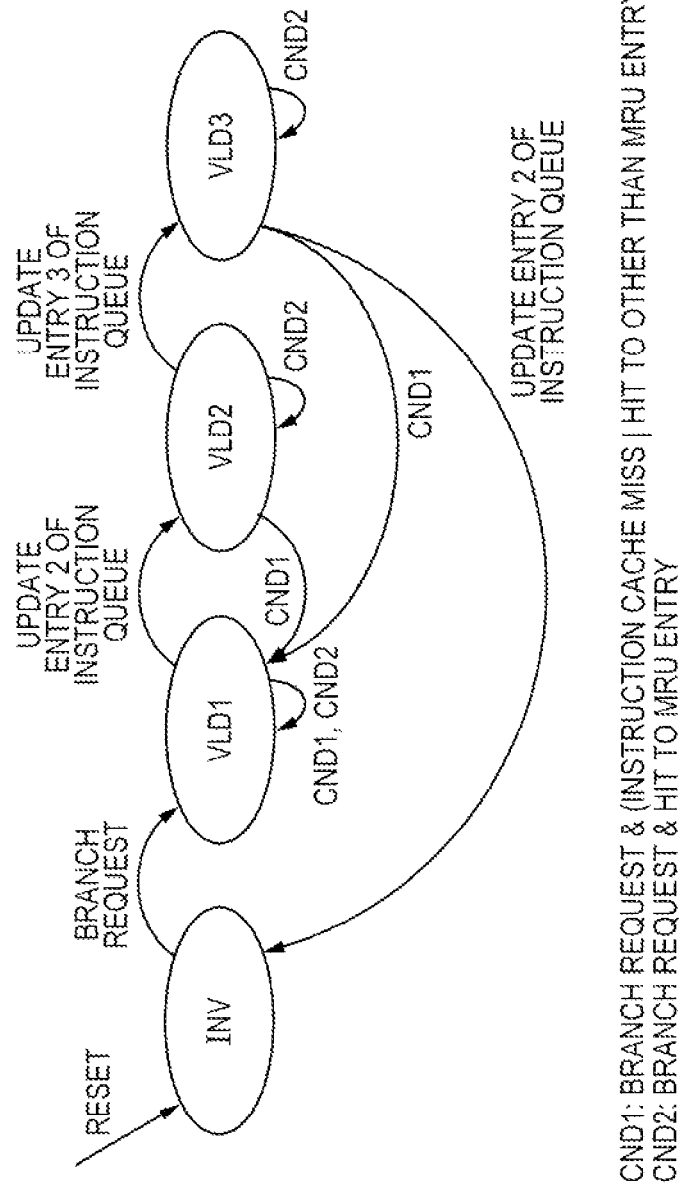
FIG. 15 is a state shifting diagram showing the operation of the short loop determination circuit of FIG. 2.

FIG. 15 is a state shifting diagram showing the operation of the short loop determination circuit of FIG. 2. FIG. 16 is a diagram showing in tabular form, control operations at the time of branch requests in respective states of FIG. 15.

Referring to FIGS. 2, 15 and 16, the short loop determination circuit 52 (state machine) has four states of INV (Invalid), VAL1 (Valid), VAL2 and VAL3. The state of INV indicates the initial state (RESET state) or is indicated to be outside the range of a short loop. Immediately after shifting to the VAL1 state, only the entry 0 (QE0) of the instruction queue 30 or the entries 0 and 1 (QE0 and QE1) are valid (the transfer of an instruction to the CPU 2 is not completed). Immediately after shifting to the VAL2 state, the entries 0 through 2 (QE0 through QE2) of the instruction 30 are valid. Immediately after shifting to the VAL3 state, the entries 0 through 3 (QE0 through QE3) of the instruction queue 30 are valid.

When a branch request is issued from the CPU 2 in the INV state, the state machine shifts to the VLD1 state. When the instruction cache memory 40 is retrieved in response to the branch request at the time of shifting to the VLD1 state so that the instruction of the branch destination is hit, the hit instruction of entry is transferred to each of the entries 0 and 1 of the instruction queue 30. In this case, the value W of the write pointer 32 is set to 2, and the value R of the read pointer 33 is set to 0. On the other hand, when the instruction of the branch destination is not hit to the instruction cache memory 40, the instruction queue 30 is reset so that the value W of the write pointer 32 and the value R of the read pointer 33 are both set to 0.

When the branch request is issued from the CPU 2 in the VLD1 state, the state machine is maintained as it is in the VLD1 state. When the instruction cache memory 40 is retrieved so that the instruction of the branch destination is hit, the hit instruction of entry is transferred to each of the entries 0 and 1 of the instruction queue 30. In this case, the value W of the write pointer 32 is set to 2, and the value R of the read pointer 33 is set to 0. On the other hand, when the instruction of the branch destination is not hit to the instruction cache memory 40, the instruction queue 30 is reset so that the value W of the write pointer 32 and the value R of the read pointer 33 are set to 0.

When the instruction is fetched from the memory 6 to the entry 2 (QE2) of the instruction queue 30 in the VLD1 state (i.e., when the value W of the write pointer 32 is changed to 3), the state machine shifts to the VLD2 state.

When the branch destination instruction is hit to the MRU entry of the instruction cache memory 40 where the branch request is issued from the CPU 2 in the VLD2 state, the state machine is maintained as it is in the VLD2 state. In this case, the instruction held in the MRU entry is transferred to each of the entries 0 and 1 of the instruction queue 30. The value W of the write pointer 32 is set to 3, and the value R of the read pointer 33 is set to 0. Accordingly, the instruction of the entry 2 of the instruction queue 30 is reused.

When the branch destination instruction is hit to other than the MRU entry of the instruction cache memory 40 where the branch request is issued from the CPU 2 in the VLD2 state, the state machine shifts to the VLD1 state. In this case, the hit instruction of entry is transferred to each of the entries 0 and 1 of the instruction queue 30. The value W of the write pointer 32 is set to 2, and the value R of the read pointer 33 is set to 0.

When the branch destination instruction is not hit to the instruction cache memory 40 where the branch request is issued from the CPU 2 in the VLD2 state, the state machine shifts to the VLD1 state. In this case, the instruction queue 30 is reset so that the value W of the write pointer 32 is set to 0 and the value R of the read pointer 33 is set to 0.

When the instruction is fetched from the memory 6 to the entry 3 (QE3) of the instruction queue 30 in the VLD2 state (i.e., when the value W of the write pointer 32 is changed to 4), the state machine shifts to the VLD3 state.

When the branch destination instruction is hit to the MRU entry of the instruction cache memory 40 where the branch request is issued from the CPU 2 in the VLD3 state, the state machine is maintained as it is in the VLD3 state. In this case, the instruction held in the MRU entry is transferred to each of the entries 0 and 1 of the instruction queue 30. The value W of the write pointer 32 is set to 4, and the value R of the read pointer 33 is set to 0. Accordingly, the instructions of the entries 2 and 3 of the instruction queue 30 are reused.

Incidentally, the instruction fetch from the memory 6 is stopped until the value R of the read pointer 33 is changed to 1.

When the branch destination instruction is hit to other than the MRU entry of the instruction cache memory 40 where the branch request is issued from the CPU 2 in the VLD3 state, the state machine shifts to the VLD1 state. In this case, the hit instruction of entry is transferred to each of the entries 0 and 1 of the instruction queue 30. The value W of the write pointer 32 is set to 2, and the value R of the read pointer 33 is set to 0.

When the branch destination instruction is not hit to the instruction cache memory 40 where the branch request is issued from the CPU 2 in the VLD3 state, the state machine shifts to the VLD1 state. In this case, the instruction queue 30 is reset so that the value W of the write pointer 32 is set to 0 and the value R of the read pointer 33 is set to 0.

When the instructions are fetched from the memory 6 in order from the entry 0 (QE0) of the instruction queue 30 to the entry 2 (QE2) thereof in the VLD3 state (i.e., when the value of the write pointer 32 is changed to 7), the state machine shifts to the INV state. This case is determined not to fall within the range of the short loop.

The above will more generally summarized as follows: Consider the following on the assumption that the instruction queue 30 includes N (where N≥2) entries and the instructions are fetched from the memory 6 in entry units. The instruction cache memory 40 includes a plurality of entries. Each entry of the instruction cache stores therein instructions corresponding to M (M<N) entries of the instruction queue (the cases of N=4 and M=2 are shown in FIGS. 15 and 16). In this case, the short loop determination circuit 52 includes a state machine having Q (where Q=N−M+2) states (INV, VAL_1, . . . , VAL_Q−1).

The state machine becomes the INV state at the start of execution of a program. When the branch request is issued from the CPU 2 in the INV state, the state machine shifts to the VAL_1 state. When the instruction is fetched into the corresponding M+ith entry in a VAL_i state (where 1≤i≤N−M) (i.e., when the value W of the write pointer 32 becomes M+i+1), the state machine shifts to a VAL_i+1 state. When the instruction is fetched from the memory to the corresponding M+1th entry of the instruction queue in the VAL_Q−1 state (i.e., when the value W of the write pointer 32 becomes N+M+1), the state machine shifts to the INV state. When the branch request is issued from the CPU 2 in the VAL_2 to VAL_Q−1 states, and the instruction of the branch destination is not hit to the MRU entry of the instruction cache memory, the state machine shifts to the VAL_1 state. When the branch request is issued from the CPU 2 in the VAL_1 state, the state machine maintains the current state.

On the other hand, when the instruction of the branch destination is hit to the MRU entry of the instruction cache memory 40 where the branch request is issued from the CPU 2 in a VAL_1+i state (1≤i≤N−M), the state machine maintains the current state and allows the instructions not to be fetched into the M+1th to M+ith entries (QE_M to QE_M+i−1) of the instruction queue in order to reuse them by the CPU. That is, the value W of the write pointer 32 is set to M+i, and the value R of the read pointer is set to 0.

Concrete Examples of Instruction Fetch Control

A description will hereinafter be made of concrete examples of the instruction fetch control by the instruction fetch unit 20 of FIG. 2.

1. Operation example in the case of cache miss (not in the case of a short loop)

FIG. 17 is a diagram showing an example of a program not intended for a short loop. Referring to FIGS. 2 and 17, the address of a branch destination after the execution of a branch instruction BRA of an address 500 becomes an address 1000. Thereafter, NOP (No Operation) instructions are sequentially executed. The instructions are fetched from the memory 6 every two NOP instructions and stored in their corresponding entries of the instruction queue 30, which are indicated by the write pointer 32.

Figure 18:
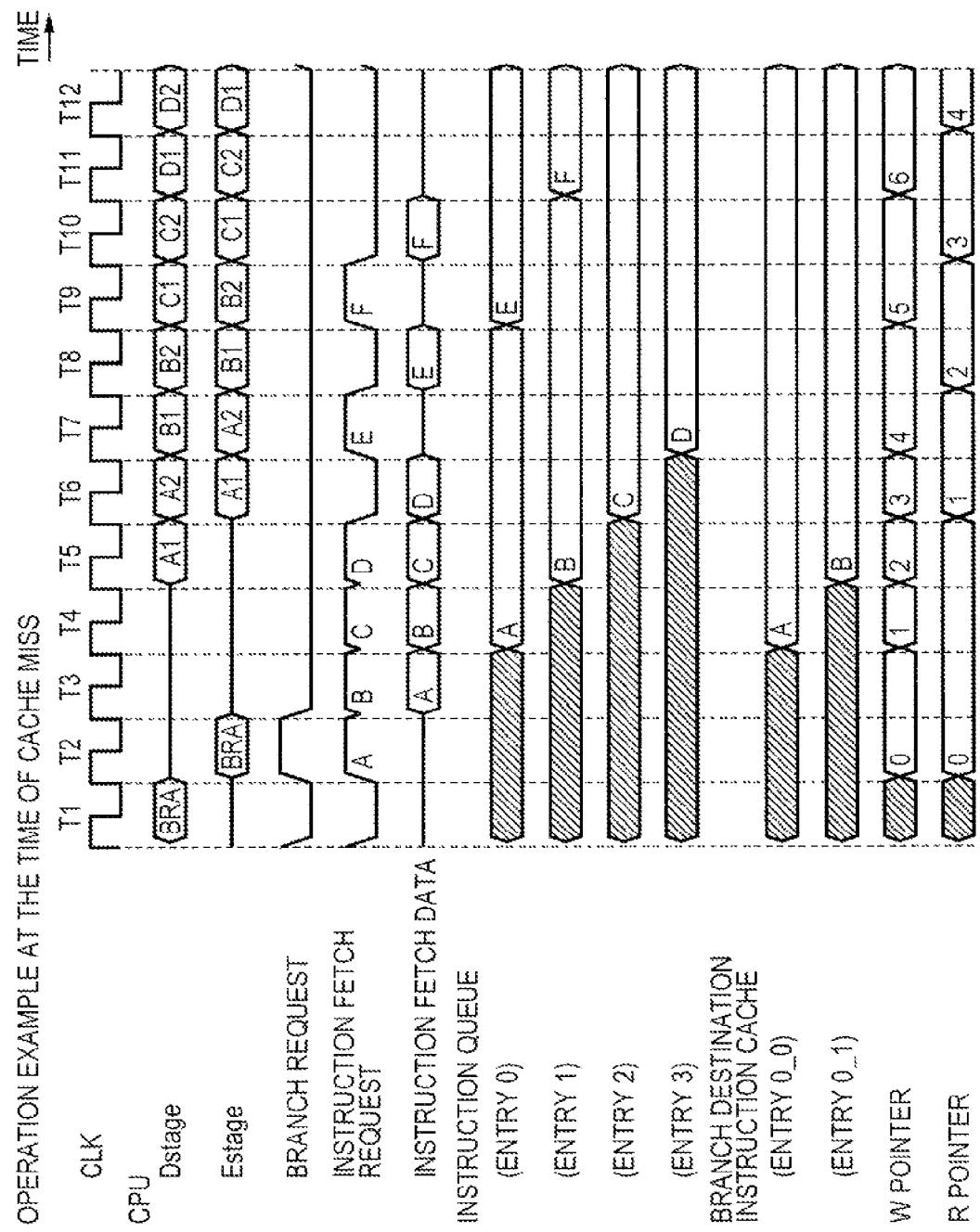
FIG. 18 is a timing diagram showing an operation example of the microprocessor of FIG. 2 at the time of a cache miss (when not in the case of short loop)

FIG. 18 is a timing diagram showing an operation example of the microprocessor of FIG. 2 at the time of a cache miss (not in the case of a short loop).

Referring to FIGS. 2 and 18, when the CPU 2 executes a branch instruction at a cycle T2, the CPU 2 outputs a branch request and outputs an instruction fetch request A to update the entry 0 of the instruction queue 30. The value W of the write pointer 32 and the value R of the read pointer 33 are set to 0 respectively.

Two NOP instructions (A1 and A2) are read from the memory 6 at the next cycle T3. The CPU 2 issues an instruction fetch request B to update the entry 1 of the instruction queue 30.

At the next cycle T4, the two NOP instructions (A1 and A2) are stored in the entry 0 (QE0) of the instruction queue 30, and the value W of the write pointer 32 is updated to 1. Two NOP instructions (B1 and B2) stored in the second address of the memory 6 are read. The CPU 2 issues an instruction fetch request C to update the entry 2 of the instruction queue 30.

At the next cycle T5, the NOP instruction (A1) is decoded by the CPU 2. The two NOP instructions (B1 and B2) are stored in the entry 1 (QE1) of the instruction queue 30, and the value W of the write pointer 32 is updated to 2. Two NOP instructions (C1 and C2) stored in the third address of the memory 6 are read. The CPU 2 issues an instruction fetch request D to update the entry 3 of the instruction queue.

At the next cycle T6, the NOP instruction (A1) is executed by the CPU 2. The NOP instruction (A2) is decoded by the CPU 2 and hence the value R of the read pointer 33 is updated to 1. The two NOP instructions (C1 and C2) are stored in the entry 2 (QE2) of the instruction queue 30, and the value W of the write pointer 32 is updated to 3. Two NOP instructions (D1 and D2) stored in the fourth address of the memory 6 are read.

At the next cycle T7, the NOP instruction (A2) is executed by the CPU 2. The NOP instruction (B1) is decoded by the CPU 2. The two NOP instructions (D1 and D2) are stored in the entry 3 (QE3) of the instruction queue 30, and the value W of the write pointer 32 is updated to 4. When the instruction codes registered in the entry 0 of the instruction queue 30 all proceed to the D stage, the CPU 2 outputs an instruction fetch request E to update the entry 0.

At the next cycle T8, the NOP instruction (B1) is executed by the CPU 2. The NOP instruction (B2) is decoded by the CPU 2 and hence the value R of the read pointer 33 is updated to 2. Two NOP instructions (E1 and E2) stored in the fifth address of the memory 6 are read.

At the next cycle T9, the NOP instruction (B2) is executed by the CPU 2. The NOP instruction (C1) is decoded by the CPU 2. The two NOP instructions (E1 and E2) are stored in the entry 0 (QE0) of the instruction queue 30, and the value W of the write pointer 32 is updated to 5. When the instruction codes registered in the entry 1 of the instruction queue 30 all proceed to the D stage, the CPU 2 outputs an instruction fetch request F to update the entry 1.

At the next cycle T10, the NOP instruction (C1) is executed by the CPU 2. The NOP instruction (C2) is decoded by the CPU 2 and hence the value R of the read pointer 33 is updated to 3. Two NOP instructions (F1 and F2) stored in the sixth address of the memory 6 are read.

At the next cycle T11, the NOP instruction (C2) is executed by the CPU 2. The NOP instruction (D1) is decoded by the CPU 2. The two NOP instructions (F1 and F2) are stored in the entry 1 (QE1) of the instruction queue 30, and the value W of the writ pointer 32 is updated to 6.

At the next cycle T12, the NOP instruction (D1) is executed by the CPU 2. The NOP instruction (D2) is decoded by the CPU 2 and hence the value R of the read pointer 33 is updated to 4.

Figure 19:
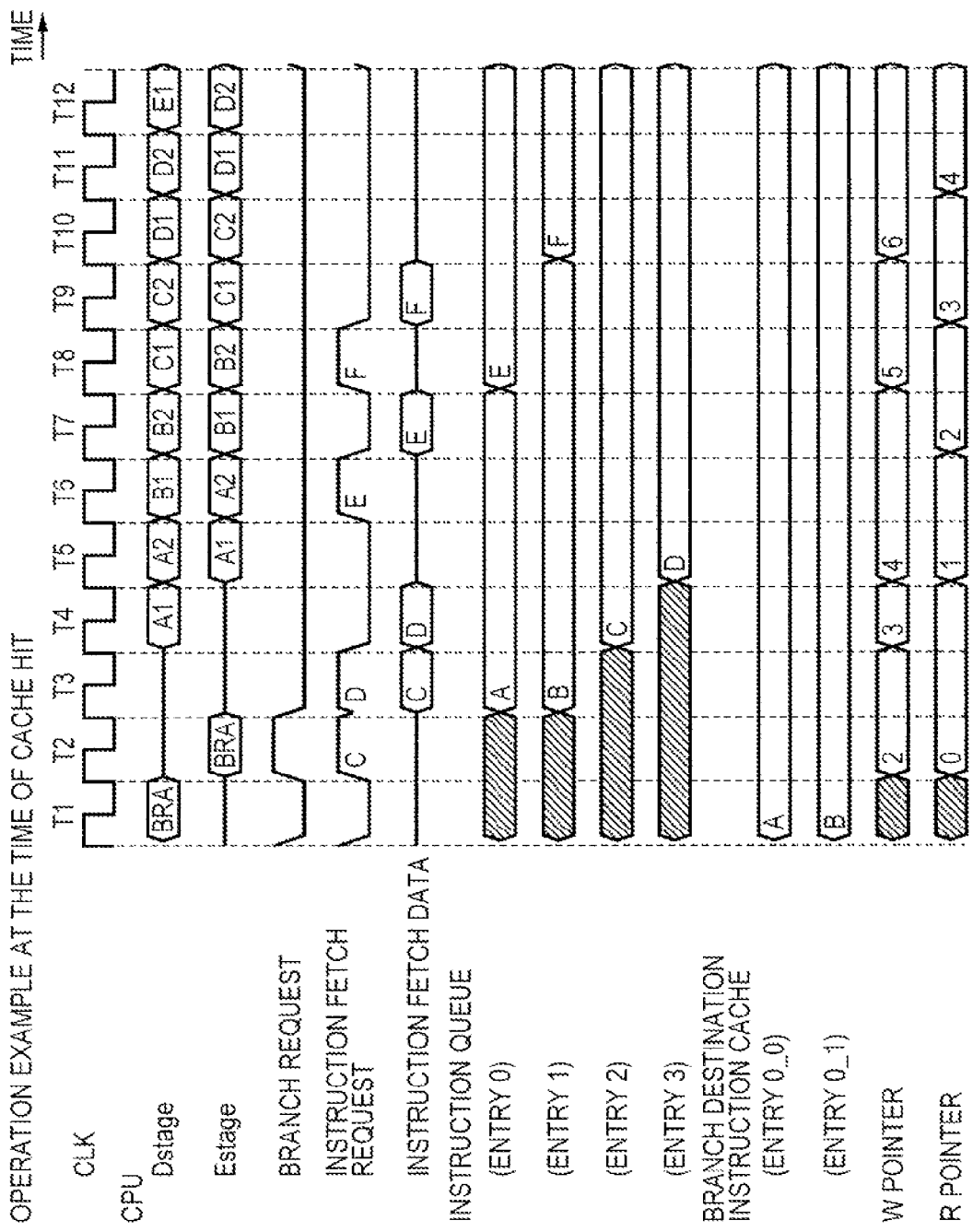
FIG. 19 is a timing diagram showing an operation example of the microprocessor of FIG. 2 at the time of a cache hit (when not in the case of short loop)

2. Operation example in the case of cache hit (when not in the case of short loop):

FIG. 19 is a timing diagram showing an operation example of the microprocessor of FIG. 2 at the time of a cache hit (not in the case of a short loop).

Referring to FIGS. 2 and 19, when the CPU 2 executes a branch instruction at a cycle T2, the CPU 2 issues a branch request and outputs an instruction fetch request C to update the entry 2 of the instruction queue 30. The value W of the write pointer 32 is set to 2, and the value R of the read pointer 33 is set to 0.

At the next cycle T3, two NOP instructions (A1 and A2) are transferred from the first half (CE0_0) of the hit entry 0 of the instruction cache memory 40 to the entry 0 (QE0) of the instruction queue 30, and two NOP instructions (B1 and B2) are transferred from the latter half (CE0_1) of the entry 0 to the entry 1 (QE1) of the instruction queue 30. Two NOP instructions (C1 and C2) are read from the memory 6. The CPU 2 outputs an instruction fetch request D to update the entry 3 of the instruction queue 30.

At the next cycle T4, the NOP instruction (A1) is decoded by the CPU 2. The two NOP instructions (C1 and C2) are stored in the entry 2 (QE3) of the instruction queue 30, and the value W of the write pointer 32 is updated to 3. Two NOP instructions (D1 and D2) stored in the fourth address of the memory 6 are read.

At the next cycle T5, the NOP instruction (A1) is executed by the CPU 2. The NOP instruction (A2) is decoded by the CPU 2 and hence the value R of the read pointer 33 is updated to 1. The two NOP instructions (D1 and D2) are stored in the entry 3 (QE3) of the instruction queue 30, and the value W of the write pointer 32 is updated to 4.

At the next cycle T6, the NOP instruction (A2) is executed by the CPU 2. The NOP instruction (B1) is decoded by the CPU 2. The CPU 2 outputs an instruction fetch request E to update the entry 0 of the instruction queue 30.

At the next cycle T7, the NOP instruction (B1) is executed by the CPU 2. The NOP instruction (B2) is decoded by the CPU 2 and hence the value R of the read pointer 33 is updated to 2. Two NOP instructions (E1 and E2) stored in the fifth address of the memory 6 are read.

At the next cycle T8, the NOP instruction (B2) is executed by the CPU 2. The NOP instruction (C1) is decoded by the CPU 2. The two NOP instructions (E1 and E2) are stored in the entry 0 (QE0) of the instruction queue 30, and the value W of the write pointer 32 is updated to 5. The CPU 2 outputs an instruction fetch request F to update the entry 1 of the instruction queue.

At the next cycle T9, the NOP instruction (C1) is executed by the CPU 2. The NOP instruction (C2) is decoded by the CPU 2 and hence the value R of the read pointer 33 is updated to 3. Two NOP instructions (F1 and F2) stored in the sixth address of the memory 6 are read.

At the next cycle T10, the NOP instruction (C2) is executed by the CPU 2. The NOP instruction (D1) is decoded by the CPU 2. The two NOP instructions (F1 and F2) are stored in the entry 1 (QE1) of the instruction queue 30, and the value W of the write pointer 32 is updated to 6.

At the cycle T11, the NOP instruction (D1) is executed by the CPU 2. The NOP instruction (D2) is decoded by the CPU 2 and hence the value R of the read pointer 33 is updated to 4.

At the next cycle T12, the NOP instruction (D2) is executed by the CPU 2. The NOP instruction (E1) is decoded by the CPU 2.

3. Operation example in the case of short loop:

FIG. 20 is a diagram showing an example of a program for a short loop. Referring to FIG. 19, the address of a branch destination after the execution of the first branch instruction becomes an address 1000. Thereafter, short loop processing is done in which NOP processing is executed four times between the addresses 1000 and 1018, and the address is returned to the address 1000, based on a branch instruction BRA at an address 1020.

Figure 21:
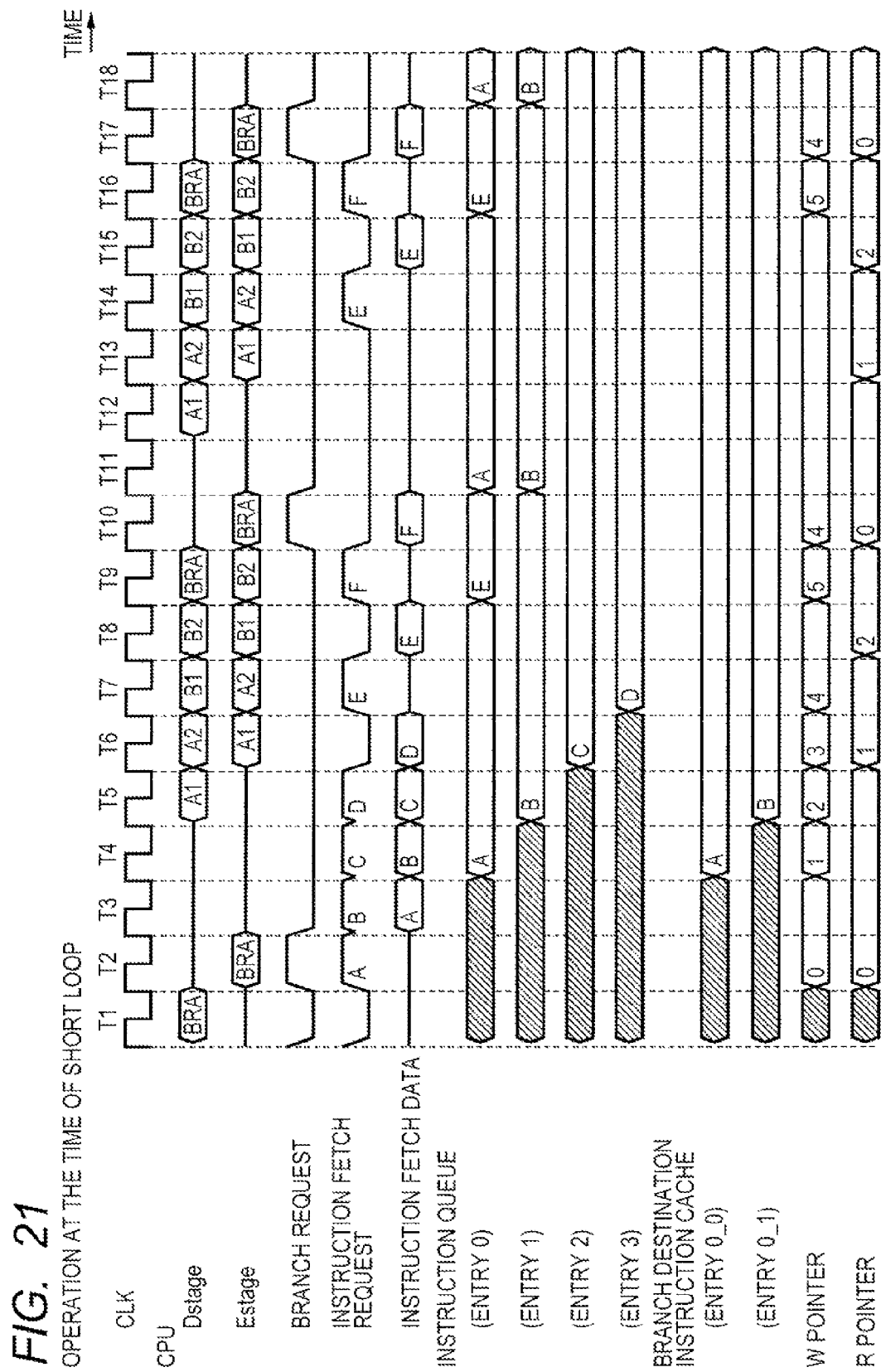
FIG. 21 is a timing diagram depicting an operation example of the microprocessor of FIG. 2 at the time of short loop processing.

FIG. 21 is a timing diagram showing an operation example of the microprocessor of FIG. 2 at the short loop processing. Since cycles T1 through T8 are similar to those in FIG. 18, their description will not be repeated. The instruction (C1) is however not taken as an NOP instruction but as a branch instruction BRA.

Referring to FIGS. 2 and 21, an NOP instruction (B2) is executed by the CPU 2 at the next cycle T9. A branch instruction BRA (C1) is decoded by the CPU 2. Two NOP instructions (E1 and E2) are stored in the entry 0 (QE0) of the instruction queue 30, and the value W of the write pointer 32 is updated to 5. When the instruction codes registered in the entry 1 of the instruction queue 30 all proceed to the D stage, the CPU 2 outputs an instruction fetch request F to update the entry 1.

At the next cycle T10, the branch instruction BRA (C1) is executed by the CPU 2 and hence the CPU 2 outputs a branch request. In response to the branch request, the short loop determination circuit 52 makes a decision of corresponding to the short loop. The value W of the write pointer 32 is set to 4, and the value R of the read pointer 33 is set to 0.

At the next cycle T11, two NOP instructions (A1 and A2) are transferred from the first half (CE0_0) of the hit MRU entry of the instruction cache memory 40 to the MRU entry 0 (QE0) of the instruction queue 30, and two NOP instructions (B1 and B2) are transferred from the latter half (CE0_1) of the entry 0 to the entry 1 (QE1) of the instruction queue 30. Since the absolute value of a difference between the value W of the write pointer 32 and the value R of the read pointer 33 is equal to 4, the CPU 2 does not output an instruction fetch request (instruction fetch is stopped).

At the next cycle T12, the NOP instruction (A1) is decoded by the CPU 2.

At the next cycle T13, the NOP instruction (A1) is executed by the CPU 2. The NOP instruction (A2) is decoded by the CPU 2 and hence the value R of the read pointer 33 is updated to 1.

At the next cycle T14, the NOP instruction (A2) is executed by the CPU 2. The NOP instruction (B1) is decoded by the CPU 2. The CPU 2 outputs an instruction fetch request E to update the entry 0 of the instruction queue 30.

At the next cycle T15, the NOP instruction (B1) is executed by the CPU 2. The NOP instruction (B2) is decoded by the CPU 2 and hence the value R of the read pointer 33 is updated to 2. The two NOP instructions (E1 and E2) stored in the fifth address of the memory 6 are read.

The next cycles T16 through T18 are the same as the already-described cycles T9 through T11 of FIG. 21.

Figure 22:
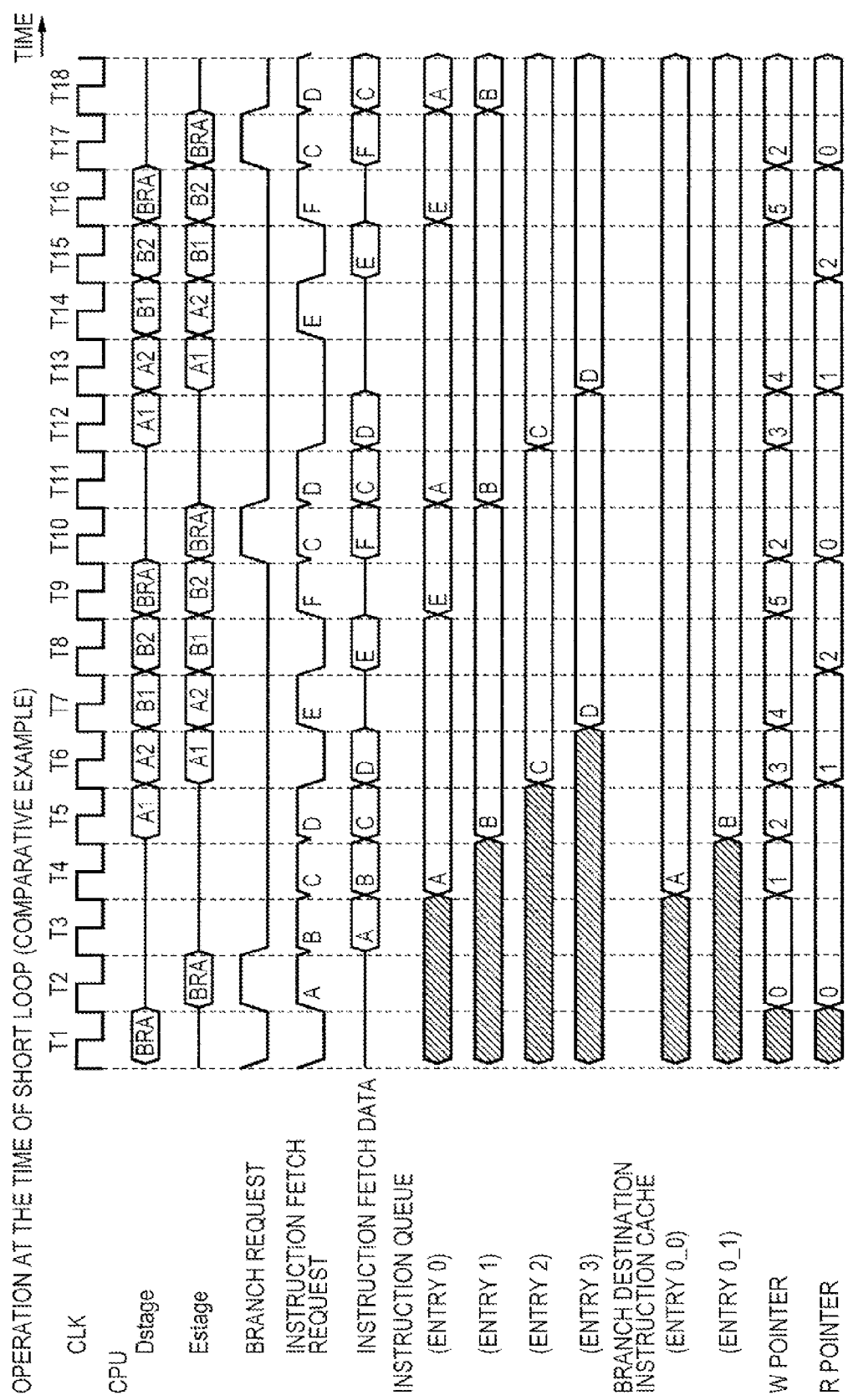
FIG. 22 is a timing diagram showing a comparative example of FIG. 21.

FIG. 22 is a timing diagram showing a comparative example of FIG. 21. In the example of FIG. 22, no short loop determination is done. Therefore, at the cycle T10, the value W of the write pointer 32 is set to 2, and the value R of the read pointer 33 is set to 0. As a result, at the cycles T10 and T11, the instruction fetch request for updating the entries 2 and 3 of the instruction queue 30 is not masked, and so the fetch request for instructions C and D proceeds. As compared with the case of FIG. 22, the number of instruction fetch requests per one round loop is reduced from four to two in the case of FIG. 21.

Advantageous Effects of First Embodiment

According to the first embodiment as described above, when the reusable instruction codes remain inside the instruction queue in the process of the short loop equivalent to about the size of the instruction queue, the control for masking the instruction fetch request is carried out by utilizing the instruction codes remaining inside the instruction queue. As a result, the number of accessing times to the main storage memory can be reduced. It can thus be expected that power consumption of the microprocessor is reduced. Further, according to the method of the present embodiment, it is possible to optimize power consumption per performance because there is no degradation in performance of the microprocessor.

Second Embodiment

A microprocessor according to a second embodiment is almost identical in operation to that according to the first embodiment, but different therefrom in terms of conditions on which an instruction fetch request is outputted. Concretely, the instruction fetch request of the entry 0 of the instruction queue 30 is done when the instructions of the entry 1 have all proceeded to the D stage. The instruction fetch request of the entry 1 of the instruction queue 30 is performed when the instructions of the entry 2 have all proceeded to the D stage. The instruction fetch request of the entry 2 of the instruction queue 30 is done when the instructions of the entry 3 have all proceeded to the D stage. The instruction fetch request of the entry 3 of the instruction queue 30 is done when the instructions of the entry 0 have all proceeded to the D stage.

Figure 23:
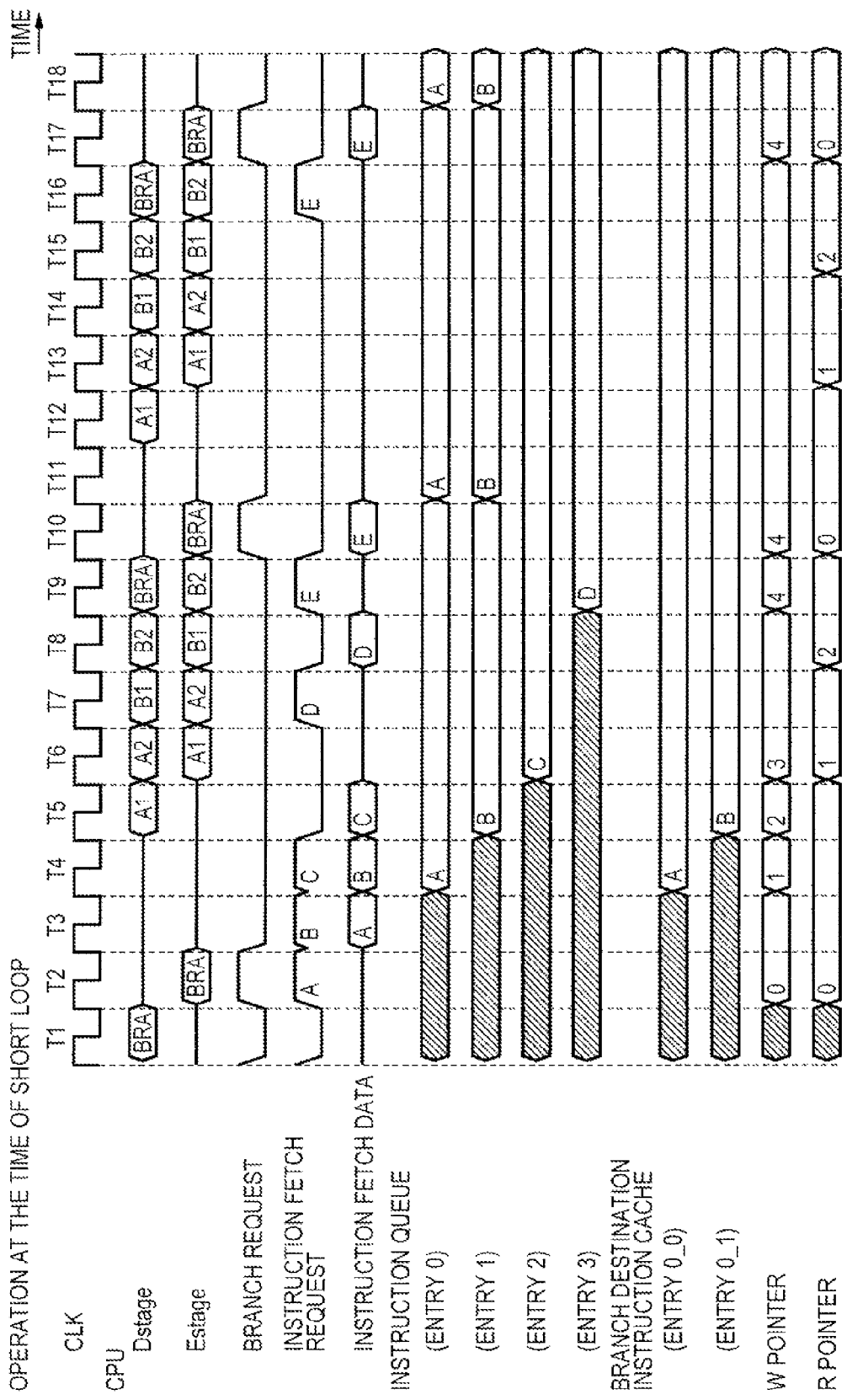
FIG. 23 is a timing diagram showing an operation example of a microprocessor according to a second embodiment.

FIG. 23 is a timing diagram showing an operation example of the microprocessor according to the second embodiment. The example of FIG. 23 is different from FIG. 21 in timing at which an instruction fetch request is outputted. That is, in FIG. 23, an instruction fetch request D is outputted with timing at which an instruction A2 proceeds to the D stage, and an instruction fetch request E is outputted with timing at which an instruction B2 proceeds to the D stage. Therefore, they are respectively delayed two cycles as compared with the case of FIG. 21.

As a result, the number of instruction fetch requests per one round loop subsequent to the second round loop is twice in the case of FIG. 21, whereas since the timing taken for the instruction fetch request is delayed in the case of the second embodiment shown in FIG. 23, no instruction fetch request F is issued and the number of instruction fetch requests per one round loop is reduced to once. As a result, the number of instruction fetches can be reduced.

In the second embodiment, however, there is a possibility that when the consumption of the instruction grows fast due to the cause such as the instruction length being long, the instruction fetches can not catch up with their supplies and hence a delay will occur in the processing of the CPU. Accordingly, the control method of FIG. 21 is preferred in such a case.

Although the invention made above by the present inventors has been described specifically on the basis of the preferred embodiments, the present invention is not limited to the embodiments referred to above. It is needless to say that various changes can be made thereto within the scope not departing from the gist thereof.

What is claimed is:

1. A semiconductor device comprising:
a memory for storing a plurality of instructions therein;
an instruction queue which temporarily stores instructions fetched from the memory;
a central processing unit which executes instructions supplied from the instruction queue;
an instruction cache which stores instructions which have been executed in the past by the central processing unit; and
a control circuit which controls fetching of instructions, wherein:
when the central processing unit executes a branch instruction, and an instruction of a branch destination is stored in the instruction cache and an instruction following the instruction of the branch destination is stored in the instruction queue,
the control circuit causes:
the instruction queue to fetch the instruction of the branch destination from the instruction cache; and
the instruction queue not to fetch the instruction following the instruction of the branch destination;
wherein when the central processing unit executes a branch instruction and an instruction of a branch destination is not stored in the instruction cache, the control circuit causes:
the instruction cache to fetch the instruction of the branch destination from the memory; and
the instruction cache to store the same therein;
wherein when the central processing unit executes a branch instruction, and an instruction of a branch destination is stored in the instruction cache and an instruction following the instruction of the branch destination is not stored in the instruction queue, the control circuit causes:
the instruction queue to fetch the instruction of the branch destination from the instruction cache; and
the instruction queue to fetch the instruction following the instruction of the branch destination from the memory;
wherein the instruction queue includes a number N entries, N≥2, each entry capable of storing one or more instructions therein,
wherein the instruction queue fetches instructions from the memory in entry units,
wherein the instruction cache includes a plurality of entries, each entry storing therein instructions corresponding to a number M entries of the instruction queue, M<N;
wherein when the central processing unit executes a branch request and an instruction of a branch destination is stored in any entry of the instruction cache, the control circuit causes instructions to be fetched into the first through Mth entries of the instruction queue from the entry of the instruction cache in which the instruction of the branch destination is stored;
wherein the control circuit determines whether a reuse condition is being satisfied, the reuse condition being that the instruction stored in each of the M+1th through Pth entries of the instruction queue, P being a number such that M<P≤N, has not yet been supplied to the central processing unit after a branch instruction has been executed previously or the instruction is not fetched anew from the memory after having been supplied to the central processing unit, and
wherein when the central processing unit executes a branch instruction, and an instruction of a branch destination is stored in the most recently used entry of the instruction cache and the reuse condition is being satisfied, the control circuit causes instructions not to be fetched into the M+1th through Pth entries of the instruction queue so that they are available for reuse by the central processing unit.

2. A semiconductor device comprising:
a memory for storing a plurality of instructions therein;
an instruction queue which temporarily stores instructions fetched from the memory;
a central processing unit which executes instructions supplied from the instruction queue;
an instruction cache which stores instructions which have been executed in the past by the central processing unit; and
a control circuit which controls fetching of instructions, wherein:
(a) when the central processing unit executes a branch instruction, and an instruction of a branch destination is stored in the instruction cache and an instruction following the instruction of the branch destination is stored in the instruction queue,
the control circuit causes:
the instruction queue to fetch the instruction of the branch destination from the instruction cache; and
the instruction queue not to fetch the instruction following the instruction of the branch destination;
(b) when the central processing unit executes a branch instruction and an instruction of a branch destination is not stored in the instruction cache,
the control circuit causes:
the instruction cache to fetch the instruction of the branch destination from the memory; and
the instruction cache to store the same therein;
(c) when the central processing unit executes a branch instruction, and an instruction of a branch destination is stored in the instruction cache and an instruction following the instruction of the branch destination is not stored in the instruction queue,
the control circuit causes:
the instruction queue to fetch the instruction of the branch destination from the instruction cache; and
the instruction queue to fetch the instruction following the instruction of the branch destination from the memory;
(d) the instruction queue includes a number N entries, N≥2, each entry capable of storing one or more instructions therein,
the instruction queue fetches instructions from the memory in entry units, and
the instruction cache includes a plurality of entries, each entry storing therein instructions corresponding to a number M entries of the instruction queue, M<N;

(e) when the central processing unit executes a branch request and an instruction of a branch destination is stored in any entry of the instruction cache, the control circuit causes instructions to be fetched into the first through Mth entries of the instruction queue from the entry of the instruction cache in which the instruction of the branch destination is stored;

wherein the control circuit comprises a state machine having a number Q states, where Q=N−M+2, wherein the state machine occupies a first state at the start of execution of a program, wherein when a branch instruction is executed by the central processing unit in the first state, the state machine shifts to a second state, wherein when an instruction is fetched into an M+ith entry in a 1+ith state, i=, 1, . . . , N−M, the state machine shifts to a 2+ith state, wherein when an instruction is fetched into the M+1th entry of the instruction queue from the memory in the Qth state, the state machine shifts to the first state, and wherein when in the 3rd through Qth states, a branch instruction is executed by the central processing unit and an instruction of a branch destination is not stored in the most recently used entry of the instruction cache, the state machine shifts to the second state.

3. The semiconductor device according to claim 2, wherein when in the 2+ith state, i=1, . . . , N−M, a branch instruction is executed by the central processing unit and an instruction of a branch destination is stored in the most recently used entry of the instruction cache, the control circuit causes instructions not to be fetched into the M+1th through M+ith entries of the instruction queue so that they are available for reuse by the central processing unit.

4. The semiconductor device according to claim 2, wherein the instruction queue includes:

a write pointer which stores an integer W incremented by 1 each time an instruction is fetched from the memory, W circulating from 0 to 2×N−1, and a read pointer which stores an integer R incremented by 1 each time an entry executed by the central processing unit is switched, R circulating from 0 to 2×N−1, wherein at the start of execution of the program or when a branch instruction is executed by the central processing unit and an instruction of a branch destination is not stored in any entry of the instruction cache, the instruction queue sets the value R of the read pointer and the value W of the write pointer to 0, wherein when a branch instruction is executed by the central processing unit and an instruction of a branch destination is stored in any entry other than the most recently used entry of the instruction cache, the instruction queue sets the value R of the read pointer to 0 and sets the value W of the write pointer to M, wherein when the branch instruction is executed in the first or second state and an instruction of a branch destination is stored in the most recently used entry of the instruction cache, the instruction queue sets the value R of the read pointer to 0 and sets the value W of the write pointer to M, and wherein when the branch instruction is executed in the 2+ith state, i=1, . . . , N−M, and an instruction of a branch destination is stored in the most recently used entry of the instruction cache, the instruction queue sets the value R of the read pointer to 0 and sets the value W of the write pointer to M+i.

5. The semiconductor device according to claim 4, wherein when the absolute value of a difference between the values W and R is equal to N, the central processing unit does not require fetching of instructions from the memory into the instruction queue.

6. The semiconductor device according to claim 5, wherein when the decoding of all instructions stored in the jth entry, j=1, . . . , N, of the instruction queue is completed, the central processing unit requires fetching of instructions from the memory into the jth entry of the instruction queue.

7. The semiconductor device according to claim 5, wherein when the decoding of all instructions stored in the jth entry, j=2, . . . , N, of the instruction queue is completed, the central processing unit requires fetching of instructions from the memory into the j−1th entry of the instruction queue, and wherein when the decoding of all instructions stored in the first entry of the instruction queue is completed, the central processing unit requires fetching of instructions from the memory into the Nth entry of the instruction queue.

* * * * *